US010635095B2

(12) United States Patent
Herzog et al.

(10) Patent No.: US 10,635,095 B2
(45) Date of Patent: Apr. 28, 2020

(54) COMPUTER SYSTEM AND METHOD FOR CREATING A SUPERVISED FAILURE MODEL

(71) Applicant: Uptake Technologies, Inc., Chicago, IL (US)

(72) Inventors: James Herzog, Downers Grove, IL (US); Benedict Augustine, Arlington Heights, IL (US); Brian Burns, Chicago, IL (US); Eric Hall, Evanston, IL (US); Tuo Li, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 157 days.

(21) Appl. No.: 15/961,715

(22) Filed: Apr. 24, 2018

(65) Prior Publication Data

US 2019/0324430 A1 Oct. 24, 2019

(51) Int. Cl.
*G05B 23/02* (2006.01)
*G07C 5/00* (2006.01)
(Continued)

(52) U.S. Cl.
CPC ..... *G05B 23/0254* (2013.01); *G05B 23/0283* (2013.01); *G06Q 50/30* (2013.01);
(Continued)

(58) Field of Classification Search
CPC ............ G05B 23/0254; G05B 23/0283; G06Q 50/30; G07C 5/006; G07C 5/008; G08G 1/207

See application file for complete search history.

(56) References Cited

U.S. PATENT DOCUMENTS 5,566,092 A 10/1996 Wang et al.
5,633,800 A 5/1997 Bankert et al.
(Continued)

FOREIGN PATENT DOCUMENTS

WO 2011117570 9/2011
WO 2013034420 3/2013
(Continued)

OTHER PUBLICATIONS

Wikipedia. Semi-supervised learning. Jul. 21, 2017, pp. 3 [online], [retrieved on Nov. 15, 2017]. Retrieved from the Internet via Wayback Machine <web.archive.org/web/20170721090432/https://en.wikipedia.org/wiki/Semi-supervised_learning>.
(Continued)

*Primary Examiner* — Calvin Cheung
(74) *Attorney, Agent, or Firm* — Lee Sullivan Shea & Smith LLP

(57) ABSTRACT

The example systems, methods, and devices disclosed herein generally relate to generating create a supervised failure model for assets in the given fleet that is configured to receive operating data as inputs and output a prediction as to the occurrence of a given failure type at the asset. In some instances, a data analytics platform may create and use an unsupervised failure model for a subset of the assets, use the respective unsupervised failure models to detect a set of anomalies that are each suggestive of a prior failure occurrence, from the set of anomalies, identify a subset of anomalies that are each suggest of a prior failure occurrence of the given failure type, and create the supervised failure model using failure data for the identified subset of anomalies.

20 Claims, 11 Drawing Sheets

(51) Int. Cl.
*G06Q 50/30* (2012.01)
*G08G 1/00* (2006.01)

(52) U.S. Cl.
CPC ............ *G07C 5/006* (2013.01); *G07C 5/008* (2013.01); *G08G 1/207* (2013.01)

(56) References Cited

U.S. PATENT DOCUMENTS

| | | | |
|---|---|---|---|
| 5,822,218 A * | 10/1998 | Moosa | G01R 31/31835 716/52 |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 9,542,296 B1 * | 1/2017 | Engers | G06F 11/3452 |
| 2002/0078403 A1 * | 6/2002 | Gullo | G06F 11/008 714/37 |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2004/0044499 A1 * | 3/2004 | House | G01R 31/343 702/181 |
| 2004/0181712 A1 | 9/2004 | Taniguchi et al. | |
| 2004/0243636 A1 | 12/2004 | Hasiewicz et al. | |
| 2005/0096873 A1 * | 5/2005 | Klein | G01H 1/006 702/184 |
| 2005/0119905 A1 | 6/2005 | Wong et al. | |
| 2005/0222747 A1 | 10/2005 | Vhora et al. | |
| 2007/0263628 A1 | 11/2007 | Axelsson et al. | |
| 2008/0059080 A1 | 3/2008 | Greiner et al. | |
| 2008/0059120 A1 | 3/2008 | Xiao et al. | |
| 2008/0172268 A1 * | 7/2008 | Wingenter | G06Q 10/06 705/305 |
| 2009/0031181 A1 | 1/2009 | Yuan et al. | |
| 2009/0265118 A1 * | 10/2009 | Guenther | G06Q 10/06 702/34 |
| 2010/0070237 A1 * | 3/2010 | Yitbarek | G06Q 10/06 702/177 |
| 2011/0064278 A1 * | 3/2011 | Wu | G06K 9/03 382/112 |
| 2011/0270779 A1 | 11/2011 | Showalter | |
| 2012/0025997 A1 | 2/2012 | Liu et al. | |
| 2012/0191633 A1 | 7/2012 | Liu et al. | |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0024416 A1 | 1/2013 | Herzog | |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0089035 A1 | 3/2014 | Jericho et al. | |
| 2014/0105481 A1 | 4/2014 | Hasselbusch et al. | |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0222355 A1 | 8/2014 | Cheim et al. | |
| 2014/0330600 A1 | 11/2014 | Candas et al. | |
| 2014/0330749 A1 | 11/2014 | Candas et al. | |
| 2014/0351642 A1 * | 11/2014 | Bates | G06F 11/0709 714/26 |
| 2014/0357295 A1 | 12/2014 | Skomra et al. | |
| 2014/0358601 A1 | 12/2014 | Smiley et al. | |
| 2015/0046870 A1 | 2/2015 | Goldenberg et al. | |
| 2015/0066431 A1 * | 3/2015 | Zheng | A61B 6/032 702/183 |
| 2015/0149134 A1 | 5/2015 | Mehta et al. | |
| 2015/0184549 A1 | 7/2015 | Pamujula et al. | |
| 2015/0220670 A1 | 8/2015 | Linehan et al. | |

(56) References Cited

U.S. PATENT DOCUMENTS

| | | | |
|---|---|---|---|
| 2015/0262060 A1 | 9/2015 | Husain et al. | |
| 2016/0371599 A1 | 12/2016 | Nicholas et al. | |
| 2017/0235857 A1* | 8/2017 | Haye | G05B 23/0256 |
| | | | 703/7 |
| 2018/0197354 A1* | 7/2018 | Remboski | G07C 5/0816 |
| 2019/0011931 A1* | 1/2019 | Selvam | G05D 1/0088 |

FOREIGN PATENT DOCUMENTS

| | | |
|---|---|---|
| WO | 2014145977 | 9/2014 |
| WO | 2014205497 | 12/2014 |

OTHER PUBLICATIONS

Alwis, Roshan. Introduction to Semi-supervised Leanring [H20.ai][Python]. Jan. 27, 2017, pp. 7 [online], [retrieved on Nov. 15, 2017]. Retrieved from the Internet <medium.com/tech-vision/introduction-to-semi-supervised-learning-h2o-ai-python-6f08c69decba>.

International Searching Authority International Search Report and Written Opinion dated Aug. 6, 2019, issued in connection with International Application No. PCT/US2019/028082, filed Apr. 18, 2019, 11 pages.

Biswas, "Redundancy-based Approaches in Wireless Multihop Network Design", PhD Dissertation Submitted to Graduate Faculty of North Carolina State University (2014).

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan. 2012).

Wikipedia. "Semi-supervised learning" en.wikipedia.org/wiki/Semi-supervised_learning, Jul. 21, 2017, (accessed via Wayback Machine at web.archive.org/web/20170721090432/https://en.wikipedia.org/wiki/Semi-supervised_learning) 3 pages.

Alwis, Roshan "Introduction to Semi-supervised Leanring [H20.ai][Python]" medium.com/tech-vision/introduction-to-semi-supervised-learning-h2o-ai-python-6108c69decba, Nov. 15, 2017, 7 pages.

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control Darmstadt University of Technology, Darmstadt, Germany, Jun. 2004, pp. 1-12.[online], [retrieved on Oct. 8, 2015]. Retrieved from the Internet <URL: http://citeseerx.ist.psu.edu/viewdoc/download?doi=10.1.1.113.9295&rep=rep1&type=pdf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online]. Infor, 2012 [retrieved May 19, 2015]. Retrieved from the Internet<URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet<URL:www.infor.com/company/news/pressroom/pressreleases/M3equipment.html>.

Infor Equipment for Rental. Datasheet [online] Infor, 2013 [retrieved May 19, 2015]. Retrieved from the Internet<URL: www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

\* cited by examiner

COMPUTER SYSTEM AND METHOD FOR CREATING A SUPERVISED FAILURE MODEL

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary. For instance, some assets include multiple subsystems that must operate in harmony for the asset to function properly (e.g., an engine, transmission, etc.).

Because of the increasing role that assets play, it is also becoming increasingly desirable to monitor and analyze assets in operation. To facilitate this, some have developed mechanisms to monitor asset attributes and detect abnormal conditions at an asset. For instance, one approach for monitoring assets generally involves various sensors and/or actuators distributed throughout an asset that monitor the operating conditions of the asset and provide signals reflecting the asset's operation to an on-asset computer. As one representative example, if the asset is a locomotive, the sensors and/or actuators may monitor parameters such as temperatures, pressures, fluid levels, voltages, and/or speeds, among other examples. If the signals output by one or more of the sensors and/or actuators reach certain values, the on-asset computer may then generate an abnormal condition indicator, such as a "fault code," which is an indication that an abnormal condition has occurred within the asset. The on-asset computer may also be configured to monitor for, detect, and generate data indicating other events that may occur at the asset, such as asset shutdowns, restarts, etc.

The on-asset computer may also be configured to send data reflecting the attributes of the asset, including operating data such as signal data, abnormal-condition indicators, and/or asset event indicators, to a remote location for further analysis.

Overview

An organization that is interested in monitoring and analyzing assets in operation may deploy a data analytics system that is configured to receive data from assets and then analyze the received asset data to learn more about the operation of the assets. This type of data analytics system may be referred to as an "asset data platform."

In recent years, one primary area of focus for an asset data platform has become the prediction of failures of an asset, such as component failures, subsystem failures, or the like. Depending on the type of asset, there may be various different types of failures that can occur at the asset while it is in operating, each of which is generally defined by the particular component (or subsystem) that may fail and the manner in which the particular component may fail. As one representative example to illustrate, the main bearing component of a wind turbine asset can fail in many different ways that prevent the bearing from continuing to perform its design purpose, which may be referred to as different "failure modes" for a wind turbine's main bearing component. For instance, a first failure mode for a wind turbine's main bearing component may comprise pitting in the surface of a ball bearing within the main bearing component, and a second failure mode for a wind turbine's main bearing component may comprise surface wear of the outer housing that contains the ball bearings. In such an example, it will be appreciated that the operation of the wind turbine asset prior to a failure of the main bearing component is likely to look different for one failure mode relative to another. Thus, each different failure mode for a given asset component may generally be considered a different failure type.

The main reason that failure prediction has become an area of focus for asset data platforms is because significant consequences can result from an asset failing while it is being used for its intended purpose (e.g., while a train is in the process of carrying cargo, a wind turbine is in the process of generating wind energy, etc.). For instance, if an asset experiences a failure while it is in use, this may significantly increase the time and/or cost necessary to get the asset back to an operational state. Further, if an asset experiences a failure while it is in use, this could also present a safety risk to individuals that are on or around the asset at the time that it fails.

In view of the foregoing, asset data platforms are now being configured to run "supervised failure models," which are predictive models that are configured to predict occurrences of different given types of failures at an asset, at some time in the future. In practice, a supervised failure model is generally created by applying a supervised learning technique to historical operating data associated with known prior occurrences of the given type of failure at one or more assets (such as assets in a fleet). However, before the supervised learning technique is applied to this historical operating data, such historical operating data generally needs to be "labeled" with additional information regarding the known prior occurrences of the given type of failure with which the historical operating data is associated, such as information regarding the type of failure that occurred and information regarding the time at which the failure the occurred.

In this respect, there are at least three different times that are relevant to a past occurrence of a failure: (1) a "failure start time," which is the time at which an asset's relevant operating data began to meaningfully deviate from expected behavior (i.e., become anomalous) in a way that is suggestive of an impending failure, (2) a "functional failure time," which is the time at which an asset's relevant operating data deviates from expected behavior so significantly that the failure becomes inevitable (i.e., the time at which the asset has failed from a functional perspective), and (3) the "actual failure time," which is the time at which the prior failure was actually identified and recorded. In accordance with the present disclosure, the supervised failure model is preferably configured to predict occurrences of a failure by predicting whether an asset has reached a functional failure time, as this generally provides the most accurate prediction results. As such, it is typically the functional failure time that is most relevant when labeling historical operating data for use in a supervised learning process. However, it is possible that the functional failure time may be related to the failure start time and/or actual failure through an algorithm or calculation and could thereby be used as label data for a supervised learning process as well. Such an algorithm may result in the functional failure time being equal to the failure start time, actual failure time, or somewhere between the two.

In some scenarios, a data analytics platform may have access to a substantial amount of available information regarding prior occurrences of various failures of assets in a fleet, including information regarding the time at which the failure the occurred. In these scenarios, the data analytics platform can use such information to derive label data that can be used to train a given supervised failure model that predicts occurrences of a given failure type.

However, in other scenarios, there may only be limited information available regarding prior failure occurrences in a fleet. For example, it is possible that information regarding prior failure occurrences may only be available for a limited subset of the assets in the fleet. As another example, it is possible that the available information regarding prior failure occurrences of assets in the fleet may be missing certain information that is needed to create a desired supervised failure model (e.g., information regarding the functional failure times of the prior occurrences of failures). The available information regarding prior failure occurrences of assets in a fleet may be limited in other manners as well. In situations such as this, the data analytics platform may not have sufficient information to derive label data that can be used in a supervised learning process to create a supervised failure model, and thus the data analytics platform may be unable to create a supervised failure model that predicts occurrences of a given failure type at assets in the fleet. As a result, the assets in the fleet may continue to be at risk of experiencing unpredictable failures, which may lead to costly downtime and/or safety issues, among other problems.

To help address the aforementioned problems, disclosed herein is an approach for using unsupervised modeling techniques to derive label data for a supervised failure model, which can be used in circumstances where there is only limited information available regarding prior failure occurrences. The disclosed approach for using unsupervised modeling techniques to derive label data for a supervised failure model is described herein as a sequence of "phases," which represent the high-level functions to be carried out in accordance with the disclosed approach. However, it should be understood that the disclosed approach is merely described in this manner for the sake of clarity and explanation and that the disclosed approach may be implemented in various other manners, including the possibility that example functions may be added, removed, rearranged into different orders, grouped together into different phases, and/or not grouped together into phases at all.

According to an example embodiment, the disclosed approach may involve a first phase that is generally directed to determining a set of deviation bounds for a first subset of assets in the given fleet that have known prior failure occurrences. This first phase may involve functions that include (a) identifying a first subset of assets in the given fleet that includes any asset having at least one known prior failure occurrence, (b) obtaining historical operating data for each asset in the first subset that includes values, (c) cleaning the historical operating data for each asset in the first subset by removing historical operating data from any time period associated with a known prior failure occurrence, (d) using the cleaned historical operating data for the assets in the first subset to determine a set of deviation bounds for the first subset of assets (which may involve creation and use of an unsupervised failure model for each asset in the first subset), and (e) using the determined set of deviation bounds for the first subset of assets as the basis for defining an initial set of anomaly thresholds for the given fleet. The first phase of the disclosed approach may involve various other functions as well.

Next, the disclosed approach may involve a second phase that is generally directed to classifying the remaining assets in the given fleet into a second subset of assets that have suspected prior failure occurrences and a third subset of assets that do not have known or suspected prior failure occurrences. This second phase may involve functions that include (a) analyzing historical operating data for the remaining assets in the given fleet (i.e., assets in the given fleet that are not in the first subset) to identify any assets suspected to have at least one prior failure occurrence (which may involve creation and use of unsupervised failure models for the remaining assets in the given fleet), (b) classifying the identified assets as being part of the second subset of assets, and (c) classifying all other remaining assets in fleet as being part of the third subset of assets. The second phase of the disclosed approach may involve various other functions as well.

Next, the disclosed approach may involve a third phase that is generally directed to defining a final set of anomaly thresholds for the given fleet based on the deviation bounds for the first and third subsets of assets. This third phase may involve functions that include (a) aggregating respective sets of asset-specific deviation bounds for the assets in the third subset (which may be determined as part of the third phase) into a single set of aggregated deviation bounds for the third subset of assets, (b) using the respective sets of deviation bounds for the first and third subsets of assets to determine a set of deviation bounds for the given fleet as a whole, (c) using the determined set of deviation bounds for the given fleet as a whole as the basis for defining the final set of anomaly thresholds for the given fleet, and (d) verifying the accuracy of the final set of anomaly thresholds (which may involve re-classifying certain assets from the third subset to the second subset). The fourth phase of the disclosed approach may involve various other functions as well.

Next, the disclosed approach may involve a fourth phase that is generally directed to using the final set of anomaly thresholds for the given fleet to identify failure occurrences in the fleet of assets. This fourth phase may involve the functions of: (a) selecting which assets in the fleet are to be used to train the supervised failure model, (b) applying the final set of anomaly thresholds for the given fleet to the historical operating data for the selected assets to detect anomalies in such historical operating data, (c) identifying the times at which for the detected anomalies occurred, which are considered to be failure start times for prior failure occurrences, and (d) using the failure start times for the detected anomalies as a basis for determining the functional failure times for the detected anomalies. The fourth phase of the disclosed approach may involve various other functions as well.

Next, the disclosed approach may involve a fifth phase that is generally directed to categorizing identified prior failure occurrences by type (e.g., as defined by similar failure characteristics or the like). This categorization may take various forms. According to one implementation, the fifth phase may involve using automated statistical analysis techniques, such as clustering techniques, to automatically categorize prior failure occurrences based on their statistical properties. According to another implementation, the prior failure occurrences may be categorized based on expert analysis in which an expert may analyze operating data of each asset having experienced a prior failure occurrence as determined by the unsupervised failure models defined in the preceding phases. The identified failure occurrences may be categorized in various other manners as well.

After categorizing identified prior failure occurrences by type, the data analytics platform may generate a respective set of failure data for each different failure type, which may include (a) indications of prior occurrences of the given failure type that were detected at the given fleet using the foregoing process and (b) associated information regarding the time of the prior occurrences of the given failure type were detected at the given fleet using the foregoing process (e.g., the failure start times, functional failure times, etc.). The generated set of failure data for each different failure type may take other forms and/or include other types of information as well.

In accordance with the present disclosure, the generated set of failure data for a given failure type may then be used as label data that is input into a process for a supervised failure model for the given failure type. Such a process may take various forms. As one possibility, a process of creating a respective supervised failure model for a given failure type may involve functions that include (a) selecting the given failure type, (b) obtaining failure data for prior occurrences of the given failure type, (c) selecting a relevant set of relevant operating data variables for the given failure type, (d) obtaining historical operating data associated with the prior occurrences of the given failure type that are detected using the foregoing process, and then (e) applying a supervised learning technique to the respective subsets of historical operating data in order to create a predictive model that is configured to predict occurrences of the given failure type at an asset in the given fleet. The process of creating a supervised failure model for the given failure type may take various other forms as well.

After the supervised failure model is created using the disclosed approach, the asset data platform may begin applying the supervised failure model to operating data received from assets in the given fleet. For example, after receiving operating data from a given asset, the asset data platform may extract the data for the relevant operating data variables from the received operating data and input such data into the supervised failure model. In turn, the supervised failure model may output data indicating the model's prediction as to the occurrence of the given failure type at the given asset. Based on the model's prediction as to the occurrence of the given failure type at the given asset, the asset data platform may then take one or more actions to help prevent occurrences of the given failure type at an asset before they happen, which may reduce the time, cost, and/or safety risks associated occurrences of the given failure type.

The unsupervised failure models and/or failure data resulting from the disclosed process may be used for various other purposes as well. As one possibility, the data analytics platform may input operating data for the assets in the given fleet into the unsupervised failure models defined in the preceding process for various purposes. These purposes may include: (1) identifying instances of failure types for which supervised models have not yet been created, (2) identifying additional failure instances and functional failure times for updated training of existing supervised failure models, and (3) determining additional insights into asset behavior during failures that are developing and which are predicted by a supervised failure model. The data analytics platform may input operating data into the unsupervised failure models for various other purposes as well.

As discussed above, the examples provided herein are related to creating a supervised failure model for assets in a given fleet that is configured to receive operating data as inputs and output a prediction as to the occurrence of a given failure type at the asset. In one aspect, a computing system is provided. The system comprises: a network interface configured to facilitate communication with a plurality of assets in a given fleet, at least one processor, a non-transitory computer-readable medium, and program instructions stored on the non-transitory computer-readable medium that are executable by the at least one processor to cause the computing system to create a supervised failure model for assets in the given fleet that is configured to receive operating data as inputs and output a prediction as to the occurrence of a given failure type at the asset. The program instructions that are executable to cause the computing system to create the supervised failure model comprise program instructions stored on the non-transitory computer-readable medium that are executable by the at least one processor to cause the computing system to: (1) identify a first subset of assets in the given fleet that have known prior failure occurrences; (2) for each asset in the first subset, obtain a respective set of cleaned historical operating data for the asset and then use the respective set of cleaned historical operating data for the asset to create a respective unsupervised failure model for the asset; (3) use the respective unsupervised failure model for each asset in the first subset to determine a set of deviation bounds for the first subset of assets; (4) for each remaining asset in the given fleet, obtain a respective set of historical operating data for the asset and then use the respective set of historical operating data for the asset to create a respective unsupervised failure model for the asset; (5) based on the respective unsupervised failure model for each remaining asset in the given fleet and the set of deviation bounds for the first subset of assets, classify each remaining asset in the given fleet into either a second subset of assets that have suspected prior failure occurrences or a third subset of assets that do not have known or suspected prior failure occurrences; (6) use the respective unsupervised failure model for each asset in the third subset to determine a set of deviation bounds for the third subset of assets; (7) based on the respective sets of deviation bounds for the first subset of assets and the third subset of assets, define a set of anomaly thresholds for the given fleet; (8) apply the set of anomaly thresholds to historical operating data for each of a selected group of assets in the given fleet and thereby detect a set of anomalies that are each suggestive of a prior failure occurrence; (9) from the set of anomalies, identify a subset of anomalies that are each suggestive of a prior occurrence of the given failure type; and (10) create the supervised failure model using failure data for the identified subset of anomalies.

In another example, a computer-implemented method is provided. The method comprises: (1) creating a supervised failure model for assets in a given fleet of assets that is configured to receive operating data as inputs and output a prediction as to the occurrence of a given failure type at the asset, wherein creating the supervised failure model comprises: (1) identifying a first subset of assets in the given fleet that have known prior failure occurrences; (2) for each asset in the first subset, obtaining a respective set of cleaned historical operating data for the asset and then use the respective set of cleaned historical operating data for the asset to create a respective unsupervised failure model for the asset; (3) using the respective unsupervised failure model for each asset in the first subset to determine a set of deviation bounds for the first subset of assets; (4) for each remaining asset in the given fleet, obtaining a respective set of historical operating data for the asset and then use the respective set of historical operating data for the asset to create a respective unsupervised failure model for the asset; (5) based on the respective unsupervised failure model for each remaining asset in the given fleet and the set of deviation bounds for the first subset of assets, classifying each remaining asset in the given fleet into either a second subset of assets that have suspected prior failure occurrences or a third subset of assets that do not have known or suspected prior failure occurrences; (6) using the respective unsupervised failure model for each asset in the third subset to determine a set of deviation bounds for the third subset of assets; (7) based on the respective sets of deviation bounds for the first subset of assets and the third subset of assets, defining a set of anomaly thresholds for the given fleet; (8) applying the set of anomaly thresholds to historical operating data for each of a selected group of assets in the given fleet and thereby detect a set of anomalies that are each suggestive of a prior failure occurrence; (9) from the set of anomalies, identifying a subset of anomalies that are each suggestive of a prior occurrence of the given failure type; and (10) creating the supervised failure model using failure data for the identified subset of anomalies.

In yet a further example, a non-transitory computer-readable medium is provided. The non-transitory computer-readable medium comprises programs instructions stored thereon that are executable to cause a computing system to: create a supervised failure model for assets in the given fleet that is configured to receive operating data as inputs and output a prediction as to the occurrence of a given failure type at the asset, wherein program instructions that are executable to cause the computing system to create the supervised failure model comprise program instructions stored on the non-transitory computer-readable medium that are executable by the at least one processor to cause the computing system to: (1) identify a first subset of assets in the given fleet that have known prior failure occurrences; (2) for each asset in the first subset, obtain a respective set of cleaned historical operating data for the asset and then use the respective set of cleaned historical operating data for the asset to create a respective unsupervised failure model for the asset; (3) use the respective unsupervised failure model for each asset in the first subset to determine a set of deviation bounds for the first subset of assets; (4) for each remaining asset in the given fleet, obtain a respective set of historical operating data for the asset and then use the respective set of historical operating data for the asset to create a respective unsupervised failure model for the asset; (5) based on the respective unsupervised failure model for each remaining asset in the given fleet and the set of deviation bounds for the first subset of assets, classify each remaining asset in the given fleet into either a second subset of assets that have suspected prior failure occurrences or a third subset of assets that do not have known or suspected prior failure occurrences; (6) use the respective unsupervised failure model for each asset in the third subset to determine a set of deviation bounds for the third subset of assets; (7) based on the respective sets of deviation bounds for the first subset of assets and the third subset of assets, define a set of anomaly thresholds for the given fleet; (8) apply the set of anomaly thresholds to historical operating data for each of a selected group of assets in the given fleet and thereby detect a set of anomalies that are each suggestive of a prior failure occurrence; (9) from the set of anomalies, identify a subset of anomalies that are each suggestive of a prior occurrence of the given failure type; and (10) create the supervised failure model using failure data for the identified subset of anomalies.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
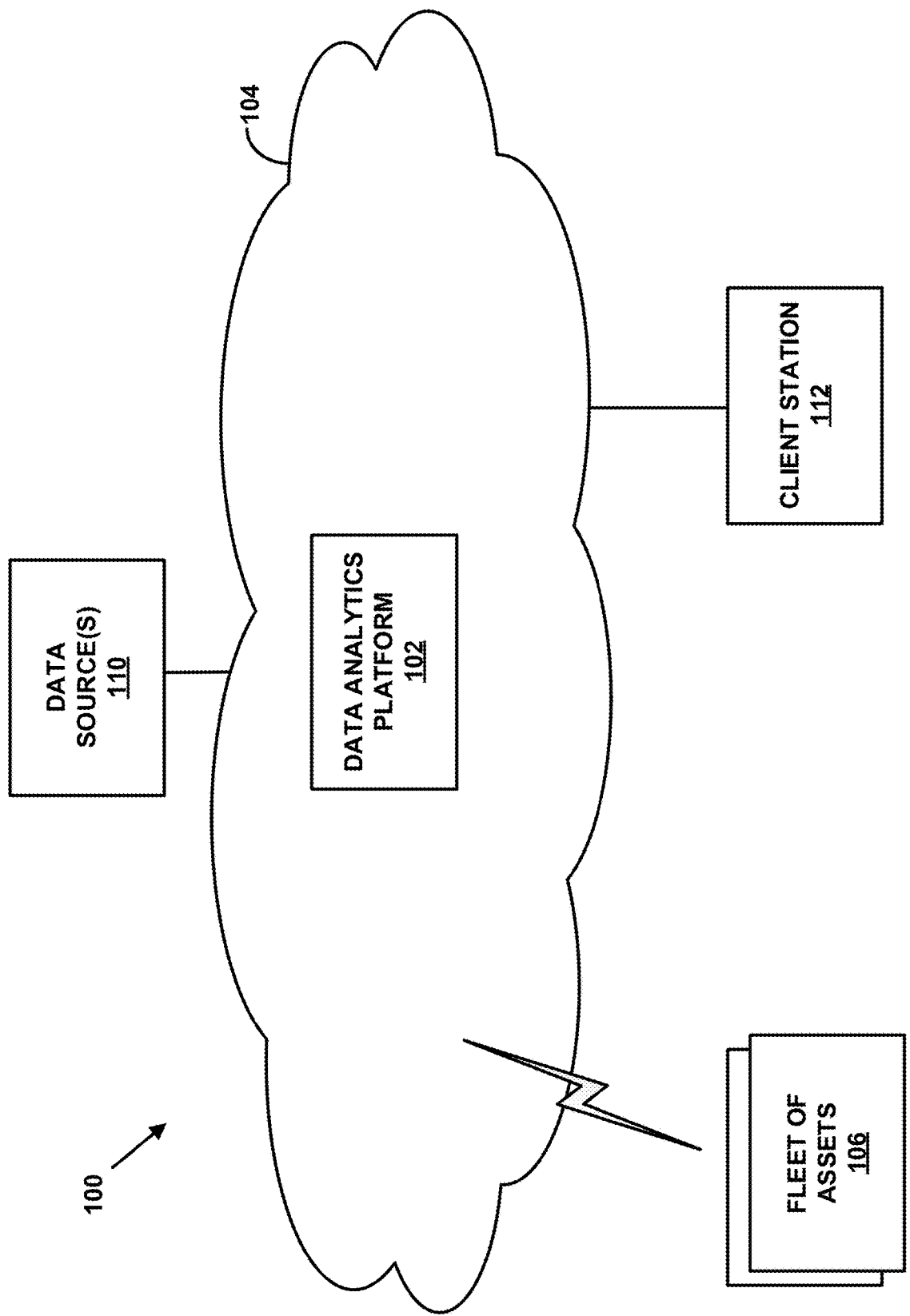
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as a data analytics platform, which may communicate via a communication network 104 with one or more fleets of assets, one or more data sources, and one or more client stations or other output systems. (As used herein, the term "fleet of assets" may generally refer to any group or two or more assets that are related to one another in some manner). For instance, the data analytics platform 102 is shown in FIG. 1 to be in communication with a representative fleet of assets 106 that includes a plurality of related assets, a representative data source 110, and a representative client station 112. It should be understood that the network configuration may include various other systems as well.

Broadly speaking, data analytics platform 102 (sometimes referred to herein as an "asset condition monitoring system") may take the form of one or more computer systems that are configured to receive, ingest, process, analyze, and/or provide access to asset-related data. For instance, data analytics platform 102 may include one or more servers (or the like) having hardware components and software components that are configured to carry out one or more of the functions disclosed herein for receiving, ingesting, processing, analyzing, and/or providing access to asset-related data. In this respect, data analytics platform 102 may be arranged to receive and transmit data according to dataflow technology, such as TPL Dataflow or NiFi, among other examples. Additionally, data analytics platform 102 may include one or more user interface components that enable a platform user to interface with the platform. The platform may be configured to perform other functions and/or may take other forms as well. Data analytics platform 102 is discussed in further detail below with reference to FIGS. 4-5.

In practice, the one or more computing system that make up data analytics platform 102 may be located in a single physical location or distributed amongst a plurality of locations, and may be communicatively linked via a system bus, a communication network, or some other connection mechanism. For instance, in one implementation, data analytics platform 102 may comprise the computing infrastructure of an Internet Area Network (IAN), such as a public, private, and/or hybrid cloud. In another implementation, data analytics platform 102 may comprise one or more dedicated servers. Other implementations of data analytics platform 102 are possible as well.

As shown in FIG. 1, data analytics platform 102 may be configured to communicate, via the communication network 104, with the one or more assets, data sources, and/or output systems in the network configuration 100. For example, data analytics platform 102 may receive asset-related data, via the communication network 104, that is sent by one or more assets and/or data sources. As another example, data analytics platform 102 may transmit asset-related data and/or commands, via the communication network 104, for receipt by an output system, such as a client station, a work-order system, a parts-ordering system, etc. Data analytics platform 102 may engage in other types of communication via the communication network 104 as well.

In general, the communication network 104 may include one or more computing systems and network infrastructure configured to facilitate transferring data between data analytics platform 102 and the one or more assets, data sources, and/or output systems in the network configuration 100. The communication network 104 may be or may include one or more IANs (such as public, private, or hybrid clouds), Wide-Area Networks (WANs) (such as the Internet or a cellular network), Local-Area Networks (LANs), and/or dedicated communication links, which may be wired and/or wireless and may support secure communication. Further, the communication network 104 may operate according to one or more communication protocols, such as LTE (Long Term Evolution), CDMA (Carrier Division Multiple Access), GSM, LPWAN, WiFi (e.g. the 802.11x family of protocols from the Institute of Electrical and Electronics Engineers (IEEE)), Bluetooth, Fibre Channel, Ethernet (e.g. the IEEE 802.3x family of standards), WDM (Wavelength Division Multiplexing), HTTP/S (Secure/Hypertext Transport Protocol), TLS (Transport Level Security), TCP (Transmission Control Protocol), UDP (Universal Datagram Protocol), ATM, FDDI, CoAP (Constrained Application Protocol)/DTLS (datagram Transport Layer Security), and/or the like. The communication network 104 may include other types of networks and/or operate according to other communication protocols as well.

Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between data analytics platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and data analytics platform 102 may then be configured to receive the asset-related data from the one or more intermediary systems. As another example, data analytics platform 102 may communicate with an output system via one or more intermediary systems, such as a host server (not shown). Many other configurations are also possible.

In general, the assets in fleet 106 may each take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), unmanned aerial vehicles, and data network nodes (e.g., personal computers, routers, bridges, gateways, switches, etc.), among other examples. Additionally, the assets of each given type may have various different configurations (e.g., brand, make, model, software version, etc.).

As such, in some examples, the assets in fleet 106 may each be of the same type (e.g., a fleet of locomotives or aircrafts, a group of wind turbines, a pool of milling machines, or a set of magnetic resonance imagining (MRI) machines, among other examples) and perhaps may have the same configuration (e.g., the same brand, make, model, firmware version, etc.). In other examples, the assets in fleet 106 may have different asset types or different configurations (e.g., different brands, makes, models, and/or software versions). For instance, the assets in fleet 106 may be different pieces of equipment at a job site (e.g., an excavation site) or a production facility, or different nodes in a data network, among numerous other examples. Those of ordinary skill in the art will appreciate that these are but a few examples of assets and that numerous others are possible and contemplated herein.

Depending on an asset's type and/or configuration, each asset in the fleet 106 may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by data analytics platform 102. For example, the data source 110 may collect and provide operating data that originates from the assets (e.g., historical operating data, training data, etc.), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, data analytics platform 102 may receive data from the data source 110 by "subscribing" to a service provided by the data source. However, data analytics platform 102 may receive data from the data source 110 in other manners as well.

The client station 112 may take the form of a computing system or device configured to access and enable a user to interact with data analytics platform 102. To facilitate this, the client station may include hardware components such as a user interface, a network interface, a processor, and data storage, among other components. Additionally, the client station may be configured with software components that enable interaction with data analytics platform 102, such as a web browser that is capable of accessing a web application provided by data analytics platform 102 or a native client application associated with data analytics platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. EXAMPLE ASSET

Figure 2:
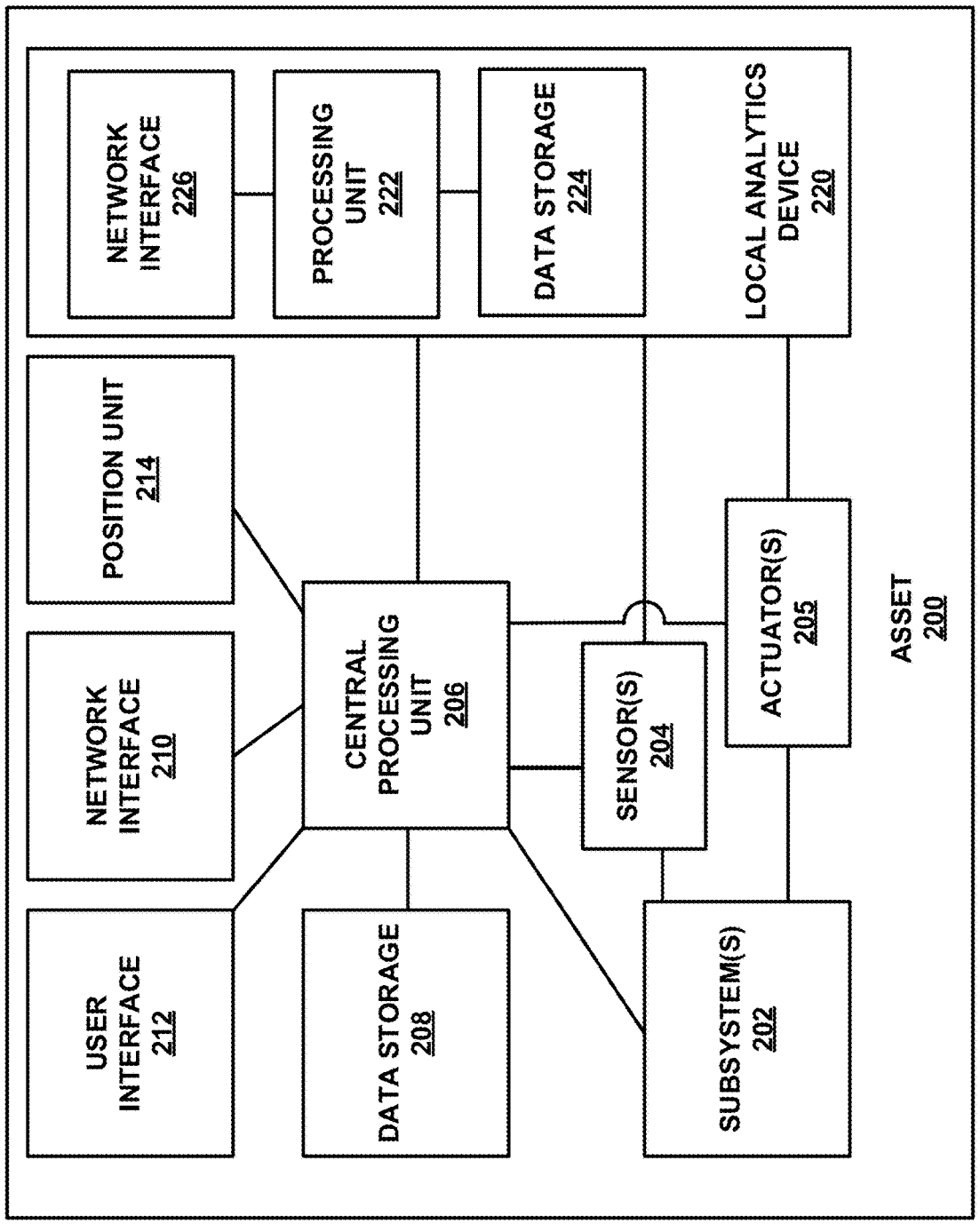
FIG. 2 depicts a simplified block diagram of an example asset.

Turning to FIG. 2, a simplified block diagram of an example asset 200 is depicted. In an example, each of the assets in fleet 106 from FIG. 1 may have a configuration similar to the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, electromechanical, and/or electronic components that are configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Depending on the asset's type and/or configuration, it should be understood that the asset 200 may additionally or alternatively include other components and/or mechanisms for monitoring the operation of the asset 200. As one possibility, the asset 200 may employ software-based mechanisms for monitoring certain aspects of the asset's operation (e.g., network activity, computer resource utilization, etc.), which may be embodied as program instructions that are stored in data storage 208 and are executable by the central processing unit 206.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators such as fault codes, which is a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as data analytics platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to data analytics platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
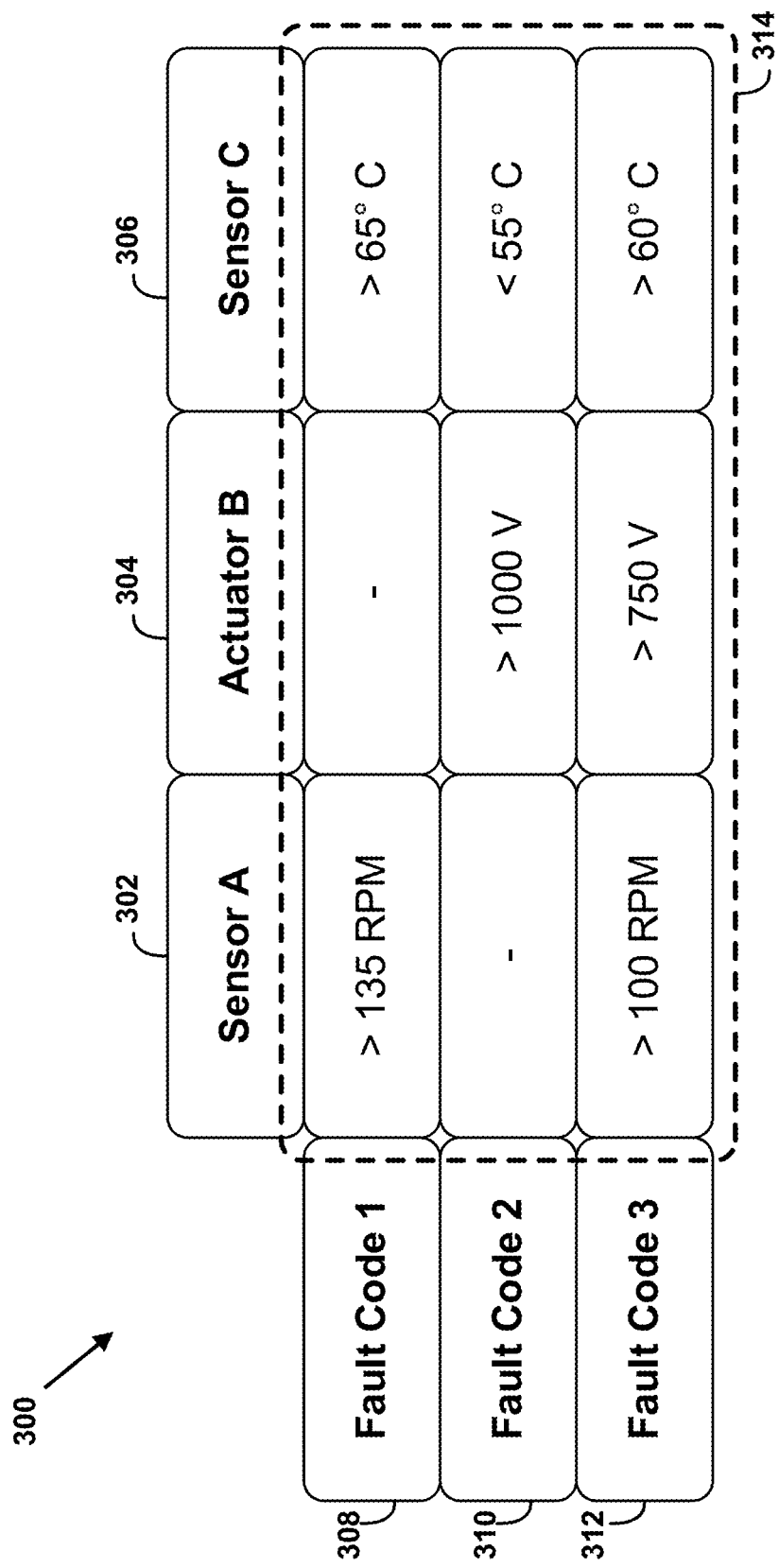
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. As one specific example, the network interface 210 may be configured to transmit operating data captured and/or otherwise generated by the asset 200, such as signal data captured by the sensors 204 and/or actuators 205 (e.g., asset usage data) and/or fault code data, to a remote computing system for further analysis. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., data analytics platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data captured by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204, actuators 205, and/or an SMU meter. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as data analytics platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective signal data (e.g., sensor and/or actuator signals) generated by the sensors 204 and/or actuators 205, and may execute a predictive model and corresponding workflow based on such signal data. Other functions are described below.

The network interface 226 may be the same or similar to the network interfaces described above. In practice, the network interface 226 may facilitate communication between the local analytics device 220 and data analytics platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, depending on the asset type, other assets may include additional components not pictured and/or more or less of the pictured components. Moreover, a given asset may include multiple, individual assets that are operated in concert to perform operations of the given asset. Other examples are also possible.

III. EXAMPLE PLATFORM

Figure 4:
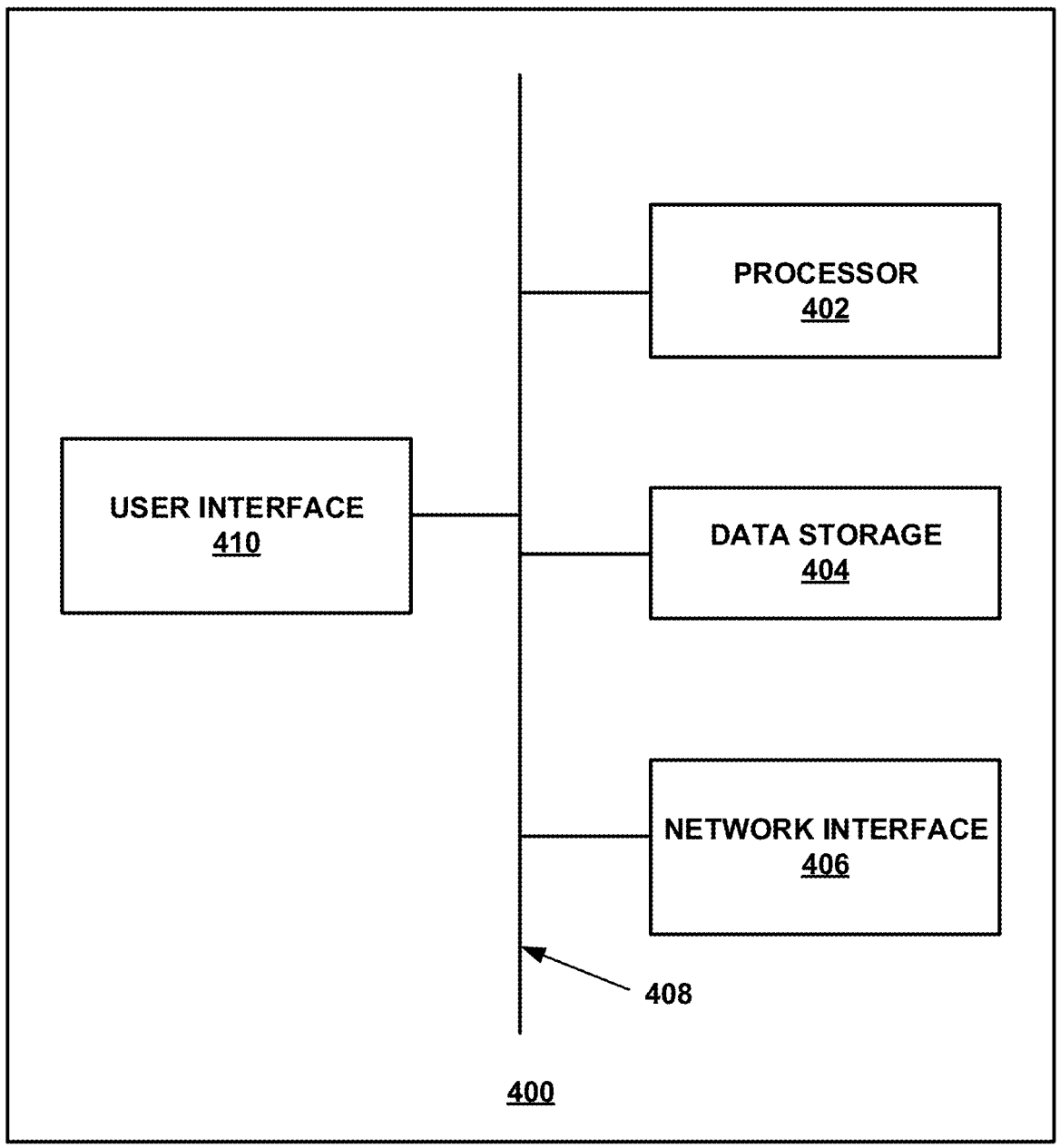
FIG. 4 depicts a structural diagram of an example platform.

FIG. 4 is a simplified block diagram illustrating some components that may be included in an example data asset platform 400 from a structural perspective, which could serve as the data analytics platform 102 in FIG. 1. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 that may take the form of a system bus, communication network such as an IAN (e.g., a public, private, or hybrid cloud), or some other connection mechanism.

The processor 402 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 402 could comprise processing components that are distributed across a plurality of physical computing devices connected via a network, such as a computing cluster of an IAN (e.g., a public, private, or hybrid cloud).

In turn, data storage 404 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 404 may comprise computer-readable storage mediums that are distributed across a plurality of physical computing devices connected via a network, such as a storage cluster of an IAN (e.g., a public, private, or hybrid cloud) that operates according to technology such as AWS for Elastic Compute Cloud, Simple Storage Service, etc.

As shown in FIG. 4, the data storage 404 may be provisioned with software components that enable the platform 400 to carry out the functions disclosed herein. These software components may generally take the form of program instructions that are executable by the processor 402, and may be arranged together into software applications, virtual machines, software development kits, toolsets, or the like.

In addition, the data storage 404 may be arranged to store data related to the functions carried out by the platform 400 in a database or the like. Examples of databases that may be used by the platform 400 include time-series databases, document databases, relational databases (e.g., MySQL), key-value databases, and graph databases, among others, and in some implementations, the platform 400 may use poly-glot storage. Further, in some implementations, the data storage 404 may store data using a broadly-distributable and highly-scalable multi-node technology such as Elasticsearch and/or MongoDB shards. The data storage 404 may take other forms and/or store data in other manners as well.

The network interface 406 may be configured to facilitate wireless and/or wired communication between the platform 400 and various network components coupled to the communication network 104, such as the assets in fleet 106, data source 110, and client station 112. Additionally, in an implementation where the platform 400 comprises a plurality of physical computing devices connected via a network, the network interface 406 may be configured to facilitate wireless and/or wired communication between these physical computing devices (e.g., between computing and storage clusters in an IAN). As such, the network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. The network interface 406 may also include multiple network interfaces that support various different types of network connections, some examples of which may include Hadoop, FTP, relational databases, high frequency data such as OSI PI, batch data such as XML, and Base64. Other configurations are possible as well.

In some embodiments, the platform 400 may additionally include one or more physical interfaces 410 that facilitate user interaction with the platform 400. For example, the platform's one or more physical interfaces may take the form of ports, short-range wireless transceivers, or the like that provide connectivity with external user-interface equipment (sometimes referred to as "peripherals") such as a keyboard, a mouse or trackpad, a display screen, a touch-sensitive interface, a stylus, a virtual-reality headset, speakers, etc. As another example, the platform's one or more physical interfaces may take the form of user-interface components that are physically integrated into the platform 400, such as an integrated keyboard, trackpad, display screen, and/or a touch-sensitive interface. The platform's one or more physical interfaces may take other forms as well.

It should also be understood that, instead of interacting with the platform 400 via the physical interface(s) 410, a user may interact with the platform 400 via a client station that is communicatively coupled to the platform 400 via a communication network and the platform's network interface 406.

In either case, the platform 400 may be configured to provide a graphical user interface (GUI) through which a user may perform administration functions for the platform 400 (e.g., functions for managing and monitoring a cloud infrastructure).

Figure 5:
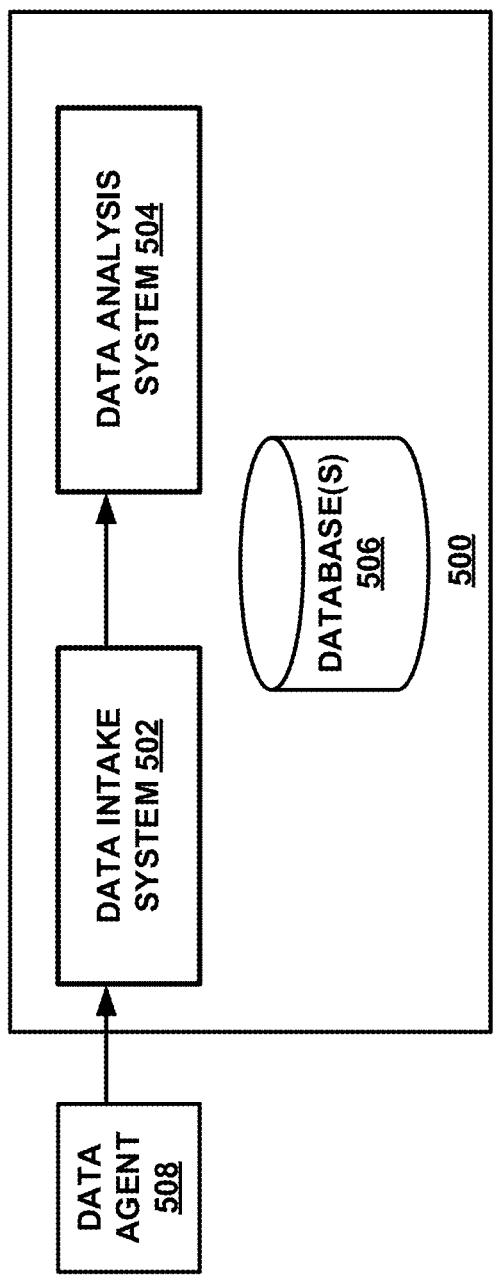
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset-related data source, etc.), that source may be provisioned with a data agent 508. In general, the data agent 508 may be a software component that functions to access asset-related data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset-related data to the example platform 500 without the assistance of a data agent.

The asset-related data received by the data intake system 502 may take various forms. As one example, the asset-related data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset-related data may include certain attributes regarding the origin of the asset-related data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset-related data received by the data intake system 502 may take other forms as well.

The data intake system 502 may also be configured to perform various pre-processing functions on the asset-related data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions)

and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset-related data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset-related data in a first type of database (e.g., a time-series or document database) and may store the associated metadata of received asset-related data in a second type of database that permit more rapid searching (e.g., a relational database). In such an example, the metadata may then be linked or associated to the asset-related data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw, aggregated, or derived data representing the measurements taken by the sensors and/or actuators at the assets (e.g. asset usage data). The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset-related data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. EXAMPLE OPERATIONS

In accordance with the present disclosure, a "supervised failure model" is generally defined as a predictive model that is configured to predict occurrences of a given type of failure of an asset (e.g., a given failure mode for the main bearing component in a wind turbine) at some time in the future, and is created by applying a supervised learning technique to historical operating data associated with known prior occurrences of the given type of failure at one or more assets (such as assets in a fleet). However, before the supervised learning technique is applied to this historical operating data, such historical operating data generally needs to be "labeled" with additional information regarding the known prior occurrences of the given type of failure with which the historical operating data is associated, such as information regarding the type of failure that occurred and information regarding the time at which the failure the occurred.

In this respect, there are at least three different times that are relevant to a past occurrence of a failure: (1) a "failure start time," which is the time at which an asset's relevant operating data began to meaningfully deviate from expected behavior (i.e., become anomalous) in a way that is suggestive of an impending failure, (2) a "functional failure time," which is the time at which an asset's relevant operating data deviates from expected behavior so significantly that the failure becomes inevitable (i.e., the time at which the asset has failed from a functional perspective), and (3) the "actual failure time," which is the time at which the prior failure was actually identified and recorded. In accordance with the present disclosure, the supervised failure model is preferably configured to predict occurrences of a failure by predicting whether an asset has reached a functional failure time, as this generally provides the most accurate prediction results. In some instances, there may be a fourth time, referred to as a "failure stop time," that may be relevant to a past occurrence of a failure. The failure stop time may be defined as the time that a failure stops, e.g. due to an asset being repaired, etc. As such, it is typically the functional failure time that is most relevant when labeling historical operating data for use in a supervised learning process. Moreover, the functional failure time may be most relevant when labeling historical operating data because some assets may not experience an actual failure time, e.g. may be able to operate at some reduced capacity for a long time and may never actually reach an actual failure wherein the asset stops performing completely. However, it is possible that the failure start time and/or actual failure time could be used as label data for a supervised learning process as well.

In some scenarios, a data analytics platform may have access to a substantial amount of available information regarding prior occurrences of a given type of failure at assets in a fleet, including information regarding the functional failure times of the prior occurrences of the given failure type. In these scenarios, the data analytics platform can use such information to derive label data that can be used in a supervised learning process to create a supervised failure model that predicts occurrences of the given failure type.

However, in other scenarios, there may only be limited information available regarding prior occurrences of the given failure type at assets in a fleet. For example, it is possible that information regarding prior occurrences of the given failure type may only be available for a limited subset of the assets in the fleet. As another example, it is possible that the available information regarding prior occurrences of the given failure type at assets in the fleet may be missing certain information that is needed to create a desired supervised failure model (e.g., information regarding the functional failure times of the prior occurrences of failures). The available information regarding prior occurrences of the given failure type at assets in a fleet may be limited in other manners as well. In situations such as this, the data analytics platform may not have sufficient information to derive label data that can be used in a supervised learning process to create a supervised failure model, and thus the data analytics platform may be unable to create a supervised failure model that predicts occurrences of the given failure type of assets in the fleet. As a result, the assets in the fleet may continue to be at risk of experiencing unpredictable failures, which may lead to costly downtime and/or safety issues, among other problems.

A. Using Unsupervised Modeling Techniques to Derive Label Data for a Supervised Failure Model To help address the aforementioned problems, disclosed herein is an approach for using unsupervised modeling techniques to derive label data for a supervised failure model, which can be used in circumstances where there is only limited information available regarding prior occurrences of a given failure type at assets in a fleet. For purposes of illustration, the disclosed approach will be described in the context of the example network configuration 100 depicted in FIG. 1, but it should be understood that the disclosed approach may be carried out in various other contexts as well. Further, to help describe some of the example functions of the disclosed approach, flow diagrams may be referenced to describe combinations of example functions that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, it should be understood that the blocks shown in the flow diagrams may be rearranged into different orders, combined into fewer blocks, separated into additional blocks, and/or removed depending upon the particular embodiment.

The disclosed approach for using unsupervised modeling techniques to derive label data for a supervised failure model is described herein as a sequence of "phases," which represent the high-level functions to be carried out in accordance with the disclosed approach. However, it should be understood that the disclosed approach is merely described in this manner for the sake of clarity and explanation and that the disclosed approach may be implemented in various other manners, including the possibility that example functions may be added, removed, rearranged into different orders, grouped together into different phases, and/or not grouped together into phases at all.

Figure 6:
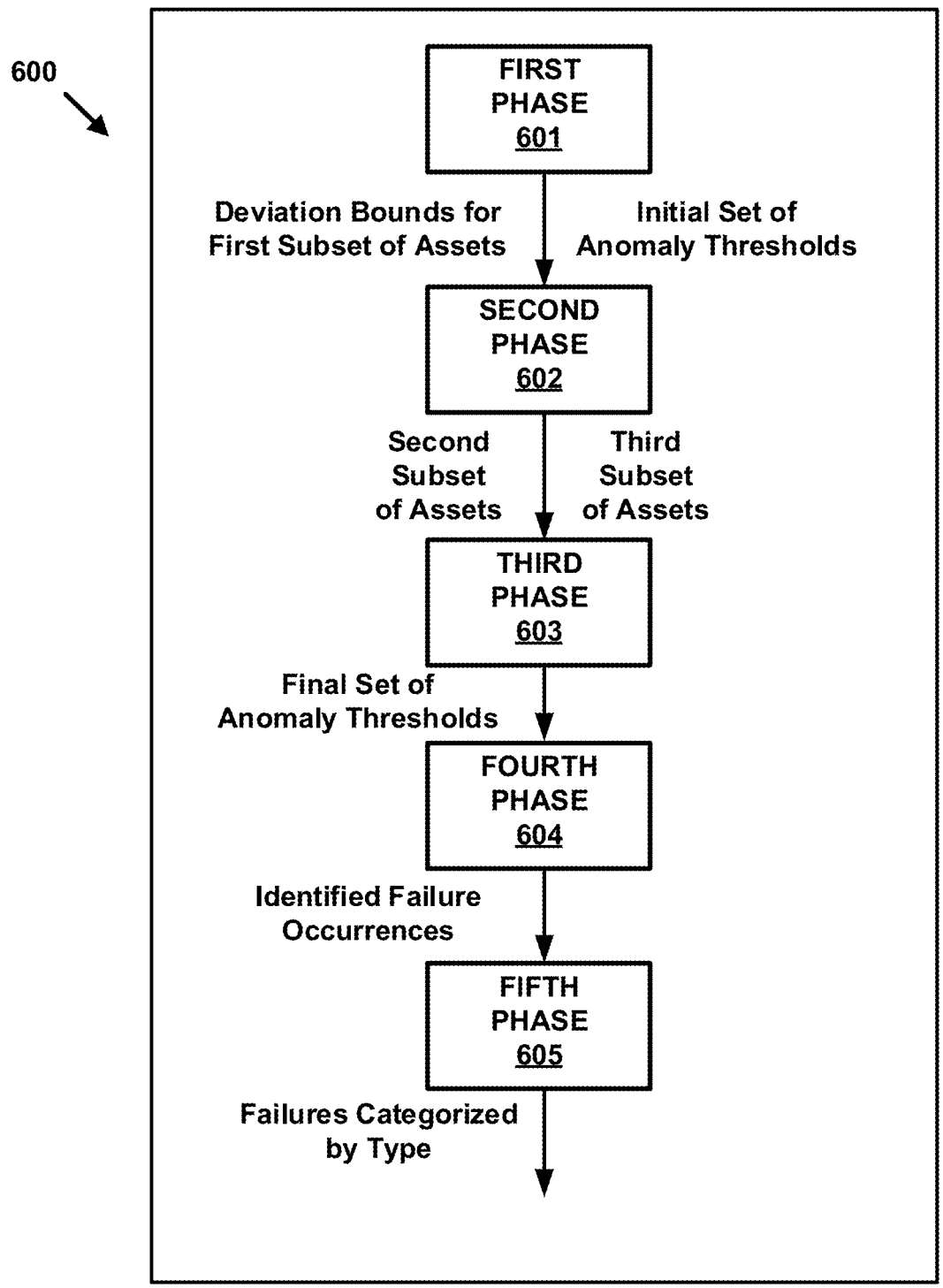
FIG. 6 is a functional block diagram that illustrates one example sequence of phases that may be included in the disclosed approach for using unsupervised modeling techniques to derive label data for a supervised failure model.

Referring now to FIG. 6, a functional block diagram 600 is provided that illustrates one example sequence of phases that may be included in the disclosed approach for using unsupervised modeling techniques to derive label data for a supervised failure model. For the purposes of illustration, the example sequence of phases is described as being carried out by the data analytics platform 102 to derive label data for a supervised failure model for fleet 106, but it should be understood that some or all of the example functions could be performed by systems other than the data analytics platform 102 (e.g., systems in communication with the data analytics platform 102) and/or that label data for a supervised failure model may be created for assets other than those in fleet 106. Further, while FIG. 6 shows these phases taking place in a given sequence, it should be understood that these phases do not necessarily need to be carried out separately in a sequential order. Rather, it is possible that certain phases may overlap with one another such that aspects of the phases may be carried out in parallel, among other possibilities.

As shown in FIG. 6, the example sequence of phases may include: (1) a first phase 601 that is generally directed to determining a set of deviation bounds for a first subset of assets in a given fleet that have known prior failure occurrences, (2) a second phase 602 that is generally directed to classifying the remaining assets in the given fleet into a second subset of assets that have suspected prior failure occurrences and a third subset of assets that do not have known or suspected prior failure occurrences, (3) a third phase 603 that is generally directed to defining a final set of anomaly thresholds for the given fleet based on respective sets of deviation bounds for the first and third subsets of assets, (4) a fourth phase 604 that is generally directed to using the final set of anomaly thresholds for the given fleet to identify failure occurrences in the fleet of assets, and (5) a fifth phase 605 that is generally directed to categorizing identified prior failure occurrences by type. These phases will each be described in turn below.

1. Determining Set of Deviation Bounds for First Subset of Assets

As shown in FIG. 6 diagram 600, the disclosed approach may begin with the first phase 601, which is generally directed determining a set of deviation bounds for a first subset of assets in fleet 106 that have known prior failure occurrences. This first phase 601 may take various forms and be carried out in various manners.

As noted above, the asset data platform 102 may be configured to receive various different types of data that relates to the operation of an asset, which may generally be referred to as operating data. This operating data may be used to determine the set of deviation bounds for the first subset, and in subsequent phases of the disclosed approach as well. For instance, an asset typically includes a set of sensors and/or actuators that each serve to (1) monitor a respective parameter that relates to the asset's operation and (2) output a time-series of signal values for the monitored parameter, where each such value corresponds to a point of time at which the value was measured. As such, the operating data received from such an asset may include time-series values captured by a plurality of different sensors and/or actuators, where the parameter captured by each respective sensor and/or actuator comprises a different operating data variable. For example, operating data received from a given asset may include one or more time-series values captured by a first sensor for a first operating variable (e.g., engine temperature), one or more time-series values captured by a second sensor for a second operating variable (e.g., rotation speed), and so on.

Additionally or alternatively, the operating data received from such an asset may also include data derived from the signal data captured by the asset's sensors and/or actuators, such as fault data and/or features data. For example, an asset may be configured to monitor for various different types of abnormal conditions at the asset and then generate respective fault indicators for each different type of abnormal condition to indicate the presence of that type of abnormal condition, in which case the presence of each different type of abnormal condition may be considered a different operating data variable. As another example, an asset may be configured to calculate values for certain "features," which are operating data variables having values that are not themselves measured but rather are derived from other measured values (such as values captured by sensors and/or actuators at the asset). The operating data received from an asset could include other types of derived operating data variables as well.

Figure 7:
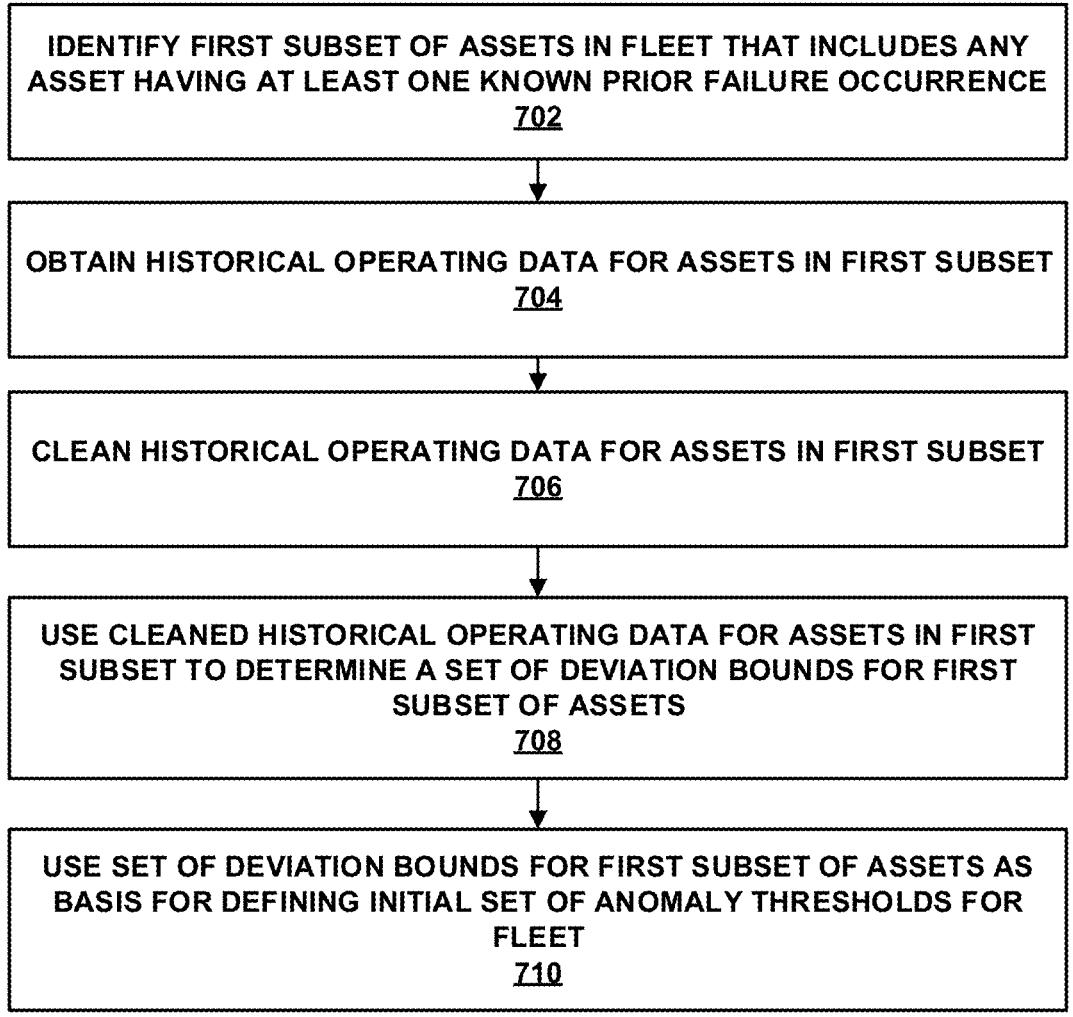
FIG. 7 a flow diagram showing some example functions that may be carried out as part of the first phase of the disclosed approach in order to determine a set of deviation bounds for a first subset of assets that have known prior failure occurrences.

FIG. 7 is a flow diagram 700 showing some example functions that may be carried out as part of the first phase 601 of the disclosed approach in order to determine a set of deviation bounds for a first subset of assets in fleet 106. As with FIG. 6, these example functions are described as being carried out by the data analytics platform 102, but some or all of the example functions could be performed by systems other than the platform or which work in conjunction with the platform. Further, it should be understood that flow diagram 700 is provided for sake of clarity and explanation and that numerous other combinations of functions may be utilized to define an initial set of anomaly thresholds for a fleet of assets—including the possibility that example functions may be added, removed, rearranged into different orders, combined into fewer blocks, and/or separated into additional blocks depending upon the particular embodiment.

The operating data received from an asset may also include values for other operating variables as well, examples of which may include asset location, asset age, asset usage, etc. Further, in addition to the operating data received from an asset, the asset data platform 102 may receive other data from an asset as well, such as asset configuration data (e.g., the asset's brand, make, model, software version, etc.), which may also be used during the supervised learning process described in further detail below.

As shown in FIG. 7, the first phase 601 may begin at block 702 with the data analytics platform 102 identifying a first subset of assets in fleet 106 that includes any asset having at least one known prior failure occurrence. In this respect, a known prior failure occurrence may comprise a prior failure occurrence that has been independently confirmed by asset operators, maintenance personnel, or subject matter experts such that there is an actual failure time recorded for the prior occurrence.

The data analytics platform 102 may identify the first subset of assets in fleet 106 in various manners. As one possible example, the data analytics platform 102 may evaluate the available historical operating data for the assets in fleet 106 (including any available label data associated with such historical operating data) in order to identify any past failure occurrences that were confirmed, and may then identify the particular assets in fleet 106 associated with these past failure occurrences as the assets to include in the first subset. In a situation where only limited information regarding past failure occurrences is available, this first subset of assets may constitute a relatively small percentage of the overall fleet 106, which may make it difficult (or impossible) to create a supervised failure model using existing approaches.

At block 704, after identifying the first subset of assets in fleet 106, the data analytics platform 102 may obtain historical operating data for each asset in the first subset. The data analytics platform 102 may perform this function in various manners. As one example, the data analytics platform 102 may already have historical operating data for the assets in the first subset stored in data storage, in which case the data analytics platform 102 may access the historical operating data from data storage. As another example, the data analytics platform 102 may request the historical operating data for the assets in the first subset from another entity (e.g., the assets themselves, an intermediate system that aggregates and stores historical operating data, etc.) and may then receive the historical operating data in response to this request. The data analytics platform 102 may obtain historical operating data for each asset in the first subset in other manners as well.

At block 706, the data analytics platform 102 may "clean" the historical operating data for each asset in the first subset by removing historical operating data from any time period associated with a known prior failure occurrence. The data analytics platform 102 may carry out this cleaning procedure in various manners, and according to one implementation, the procedure for cleaning the historical operating data for a given asset in the first subset may involve at least the following functions for each known prior failure occurrence at the given asset.

First, the data analytics platform 102 may identify the actual failure time recorded for the known prior failure occurrence at the given asset, which may be included and/or associated with the historical operating data for the given asset.

Second, the data analytics platform 102 may estimate a failure start time for the known prior failure occurrence at the given asset. For example, according to one approach, the data analytics platform 102 may estimate a failure start time for the known prior failure occurrence by subtracting a given amount of time from the actual failure time, where this given amount of time is intended to represent the upper bound on the expected amount of time between the failure start time and actual failure time for all prior failure instances, or may be determined based on available information related to the given failure occurrence, if available. In this respect, the given amount of time may be defined based on input from a user (e.g., a subject matter expert having knowledge of the physical processes that may lead to the occurrence of a prior failure occurrence) and/or analysis of historical data by the data analytics platform 102, among other examples. Further, the given amount of time may vary depending on factors such as the failure type, the attributes of the asset (e.g., the asset's configuration, age, location, etc.), when the known prior failure occurrence was detected, the particular time of year when the known prior occurrence was detected, and/or the ambient weather conditions of the asset when the known prior occurrence was detected, among other examples.

Third, the data analytics platform 102 may remove, from the given asset's historical operating data, the historical operating data from the time period bounded by the estimated failure start time and the actual failure time for the known prior occurrence of the given failure (which may be referred to as the "pre-failure" time period for the known prior occurrence of the given failure).

As a result of performing these functions for each known prior failure occurrence at each asset in the first subset, the data analytics platform 102 may produce a respective set of "cleaned" historical operating data for each asset in the first subset (i.e., historical operating data for time periods that are not associated with known prior failure occurrences). The procedure for cleaning the historical operating data for a given asset in the first subset and thereby producing a set of "cleaned" historical operating data for each asset in the first subset may take various other forms as well.

At block 708, the data analytics platform 102 may use the cleaned historical operating data for the assets in the first subset to determine a set of "deviation bounds" for the first subset of assets. In general, a given deviation bound defines an acceptable amount of difference between an asset's captured values for a given operating data variable and an unsupervised failure model's prediction (or "estimate") of what the asset's captured values for the given operating data variable should have been had the asset been operating normally. In this way, a deviation bound effectively serves as an error tolerance for the unsupervised failure model, and is used as a basis for determining whether an asset's captured values for a given operating data variable have begun to meaningfully deviate from expected behavior in a way that is suggestive of an impending failure.

The set of deviation bounds for the first subset of assets may take various forms. According to one example, the set of deviation bounds for the first subset of assets may comprise a respective pair of upper and lower deviation bounds for each operating data variable, where (1) the upper deviation bound defines an acceptable amount of difference between an asset's captured values for a given operating data variable and an unsupervised failure model's prediction of the such values in the "positive" direction (i.e., when the asset's captured value is higher than the predicted value) and (2) the lower deviation bound defines an acceptable amount of difference between an asset's captured values for a given operating data variable and an unsupervised failure model's prediction of the such values in the "negative" direction (i.e., when the asset's captured value is lower than the predicted value). According to another example, set of deviation bounds for the first subset of assets may include only a single deviation bound for a given operating data variable, which may define an acceptable amount of difference between an asset's captured values for a given operating data variable and an unsupervised failure model's prediction of the such values in both the "positive" and "negative" directions. The set of deviation bounds for the first subset of assets may take other forms as well.

The process for determining the set of deviation bounds for the first subset of assets may take various forms. According to one implementation, this process may begin with the data analytics platform 102 performing at least the following functions for each asset in the first subset: (a) creating an unsupervised failure model for the asset based on the asset's cleaned historical operating data, (b) inputting the asset's cleaned historical operating data into the unsupervised failure model for the asset and thereby producing a predicted version of the asset's cleaned historical operating data, (c) evaluating the difference between the original version of the asset's cleaned historical operating data and the predicted version of the asset's cleaned historical operating data for each relevant operating data variable, (d) based on the difference between the original and predicted versions of the asset's cleaned historical operating data for each relevant operating data variable, determining a respective pair of upper and lower deviation bounds for each relevant operating data variable, and (e) compiling the respective pairs of upper and lower deviation bounds for the relevant operating data variables into a single set of asset-specific deviation bounds for the asset.

As a result of performing the foregoing functions for each asset in the first subset, the data analytics platform 102 may produce a respective set of asset-specific deviation bounds for each asset in the first subset. In turn, the data analytics platform 102 may aggregate the respective sets of asset-specific deviation bounds for the assets in the first subset into a single set of aggregated deviation bounds to use for the first subset of assets.

In the foregoing implementation, the unsupervised failure model created for each asset in the first subset may take various forms. As one possibility, the unsupervised failure model created for each asset in the first subset may be a regression model that is configured to receive the original values for a plurality of data variables and then output predicted values for the plurality of data variables that comprise an estimate of what the values of the plurality of operating data variables were expected to be had the asset been operating normally.

One specific example of a regression model is a model based on principal component analysis (PCA), which is a technique that uses linear transformations to transform multivariate data from a first coordinate space defined by an original set of correlated variables to a second coordinate space comprising a set of orthogonal dimensions that are defined by a new set of uncorrelated variables referred to as principal components (PCs). In such an example, the data analytics platform 102 may first create a PCA-based model for a given asset by using the asset's cleaned historical operating data to create a PCA space, which is defined by an asset-specific set of PCs. In turn, the data analytics platform 102 may transform (or "project") the asset's cleaned historical operating data from its original coordinate space to the PCA space and then inversely transform (or "project") the cleaned historical operating data from the PCA space back to the original coordinate space, which produces the predicted version of the asset's cleaned historical operating data that is compared to the original version of the asset's cleaned historical operating data.

However, it should be understood that the type of unsupervised failure model created for each asset in the first subset, as well the particular process employed to create the unsupervised failure model for each asset in the first subset, may take various other forms.

Further, in the foregoing implementation, the function of determining an asset's respective pair of upper and lower deviation bounds for a given operating data variable based on the difference between the original and predicted versions of the asset's cleaned historical operating data for the given operating data variable may take various forms. When carrying out this process, the data analytics platform 102 may generally consider any difference between the original and predicted versions of the cleaned historical operating data for an asset in the first subset to be presumptively acceptable in view of the fact that the historical operating data has previously been cleaned to remove any operating data associated with known prior failure occurrences. As such, the data analytics platform 102 may define an asset's upper and lower deviation bounds for a given operating data variable such that the difference between the asset's captured values for the given operating data variable and the unsupervised failure model's prediction of such captured values fall within the asset's upper and lower deviation bounds for the given operating data variable in most or all circumstances.

As one possible example, the data analytics platform 102 may determine an asset's upper deviation bound for a given operating data variable by (1) determining, at each of a plurality of timepoints in the past, a respective difference value between the asset's captured value for the given operating data variable and the unsupervised failure model's prediction of such captured value in the "positive" direction, (2) identifying and eliminating any outlier difference value(s) in the "positive" direction, and (3) of the remaining difference values, selecting the maximum difference value as the upper deviation bound for the given operating data variable. Likewise, the data analytics platform 102 may determine a lower deviation bound for the given operating data variable using a similar process that evaluates difference values in the "negative" direction.

According to another embodiment the data analytics platform 102 may determine the upper deviation bound as the $95^{th}$ percentile statistic of the difference values, and the lower deviation bound as the $5^{th}$ percentile statistic of the difference values for a given operating data variable. In various other embodiments, the data analytics platform 102 may use statistics such as the root-mean square or the mean absolute difference to define the magnitude of the upper and lower deviation bounds. However, the data analytics platform 102 may determine an upper and/or lower deviation bound for a given operating data variable in various other manners as well.

Further yet, in the foregoing implementation, the function of aggregating the respective sets of asset-specific deviation bounds for the assets in the first subset into a single set of aggregated deviation bounds may take various forms. As one possible example, the data analytics platform 102 may iterate through each relevant operating data variable, and for each such relevant operating data variable, the data analytics platform 102 may (1) aggregate the assets' respective upper deviation bounds for the relevant operating data value (e.g., by calculating a percentile, mean, median, mode, weighted average, root-mean square, mean absolute difference, etc. of the assets' respective upper deviation bounds) into a single, aggregated upper deviation bound for the relevant operating data variable and (2) aggregate the assets' respective lower deviation bounds for the relevant operating data value (e.g., by calculating a percentile statistic of the aggregated difference values, mean, median, mode, weighted average, root-mean square, mean absolute difference, etc. of the assets' respective upper deviation bounds) into a single, aggregated lower deviation bound for the relevant operating data variable. In turn, the data analytics platform 102 may compile the aggregated upper and lower deviation bounds for each operating data variable into a single set of aggregated deviation bounds, which may be used as the set of deviation bounds for the first subset of assets. However, the data analytics platform 102 may aggregate the respective sets of asset-specific deviation bounds for the assets in the first subset into a single set of aggregated deviation bounds in other manners as well.

The foregoing implementation for determining the set of deviation bounds for the first subset of assets may take various other forms as well, including the possibility that functions may be added, removed, combined, and/or reordered. Further, other implementations for determining the set of deviation bounds for the first subset of assets may also be used.

At block 710, the data analytics platform 102 may also use the set of deviation bounds for the first subset of assets as the basis for defining an initial set of "anomaly thresholds" for fleet 106. In general, a given anomaly threshold defines a threshold at which the amount of difference between an asset's captured values for a given operating data variable and an unsupervised failure model's prediction of such captured values is considered to be anomalous. Thus, when an asset's captured values for any given operating data variable deviate from expected behavior to the point of falling outside of an anomaly threshold, the data analytics platform 102 may consider this to be an "anomaly," and the time at which any such anomaly is first detected may be considered a start time for the potential prior failure occurrence.

As with the set of deviation bounds for the first subset of assets, the initial set of anomaly thresholds for fleet 106 may take various forms. According to one example, the initial set of anomaly thresholds for fleet 106 may comprise a respective pair of upper and lower anomaly thresholds for each relevant operating data variable in the set identified in phase 602, where (1) the upper anomaly threshold defines a threshold at which the amount of difference between an asset's captured values for a given operating data variable and an unsupervised failure model's prediction of the such values in the "positive" direction is considered to be anomalous and (2) the lower anomaly threshold defines a threshold at which the amount of difference between an asset's captured values for a given operating data variable and an unsupervised failure model's prediction of the such values in the "negative" direction is considered to be anomalous.

According to another example, the initial set of anomaly thresholds for fleet 106 may include only a single anomaly threshold for a given operating data variable. In such an example, the single anomaly threshold for the given operating data variable may serve as the threshold for deviation in either the "positive" or "negative" direction, or in circumstances where a deviation in the given operating data variable in one particular direction is not relevant to the prior failure occurrence, the single anomaly threshold for the given operating data variable may serve as the threshold for deviation in only in the other direction (e.g., if the prior failure occurrence is exemplified by a high temperature of a given asset component, there may be no need to set a lower anomaly threshold for the temperature of that component). The set of anomaly thresholds for fleet 106 may take other forms as well.

The function of defining an initial set of anomaly thresholds for fleet 106 based on the set of deviation bounds for the first subset of assets may take various forms. As one possible implementation, the data analytics platform 102 may define the initial set of anomaly thresholds by multiplying each deviation bound in the set by a respective multiplication factor, which may be selected based on (1) which operating data variable is at issue and/or (2) whether it is an upper or lower bound at issue, among other factors. In this respect, the multiplication factors used to define the anomaly thresholds in the initial set may differ across different operating data variables, although the same multiplication factor could be selected for at least certain operating data variables (e.g., operating data variables of a similar type). Likewise, the multiplication factors used to define the upper and lower anomaly thresholds for a given operating data variable may be different from one another, or may be the same as one another. For example, if the prior failure occurrence is exemplified by high values for a given operating data variable, the multiplication factor for the variable's upper bound may be smaller than the multiplication factor for the variable's lower bound. Other examples are possible as well.

In practice, the multiplication factors used to define the anomaly thresholds will typically have a value above 1, such that the anomaly thresholds for fleet 106 will typically be set at values that are greater than the corresponding deviation bounds. In other words, the anomaly thresholds will typically be more forgiving than the deviation bounds, such that operating data falling outside of the deviation bounds but still within the anomaly thresholds will not trigger an anomaly. However, it is nevertheless possible that a multiplication factor for the upper and/or lower bound of a given operating data variable may have a value equal to 1, or even a value below 1.

Further, in practice, the values of the multiplication factors used to define the anomaly thresholds may be set in various manners, including being set based on input by a user (e.g., a subject matter expect) and/or analysis of historical data by the data analytics platform 102. It should also be understood that the values of these multiplication factors may be changed over time as a user and/or the data analytics platform 102 gains a further understanding of how the values of the relevant operating data variables relate to occurrences of the given failure occurrence.

The foregoing implementation for defining the initial set of anomaly thresholds for fleet 106 may take various other forms as well, including the possibility that functions may be added, removed, combined, and/or reordered. Further, other implementations for defining the initial set of anomaly thresholds for fleet 106 may also be used.

Figure 8A:
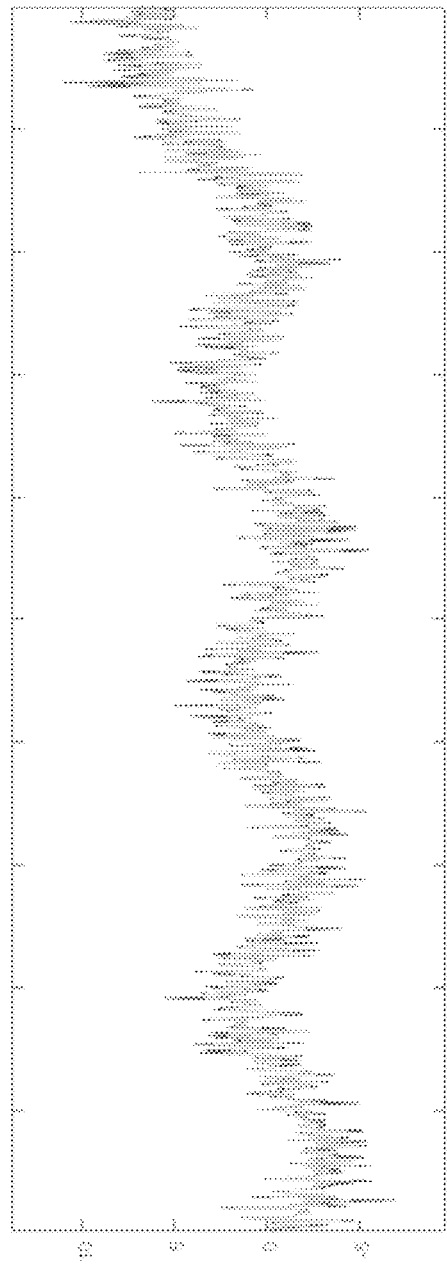
FIG. 8A-B show a set of time-series graphs that illustrate the application of an example pair of anomaly thresholds for a given data operating variable.
Figure 8B:
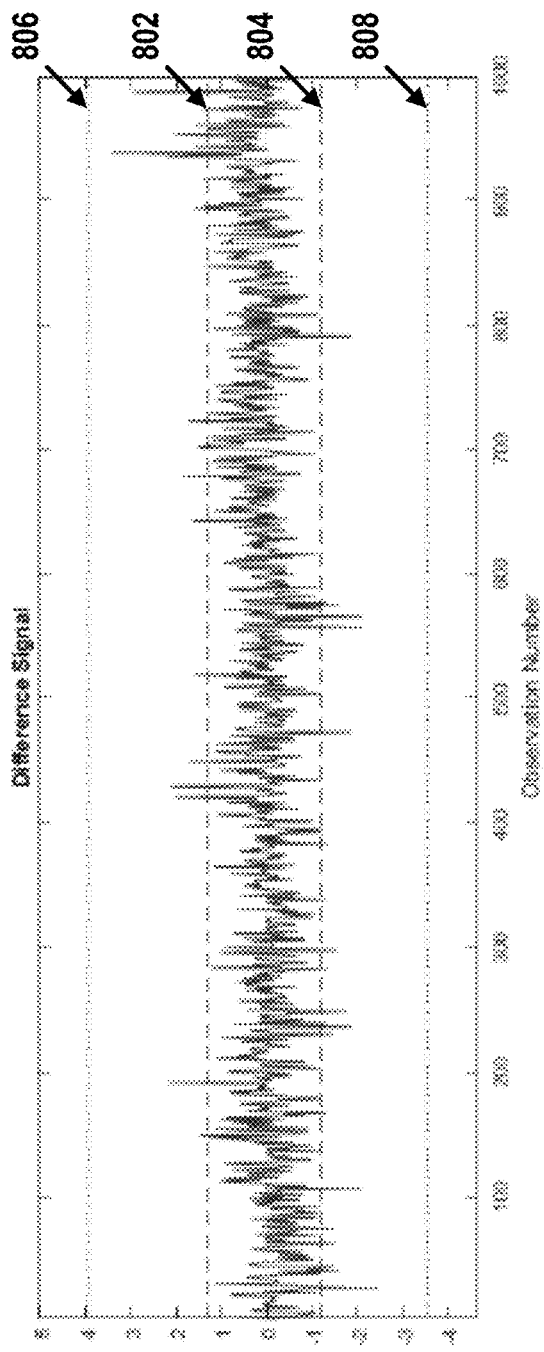

To help illustrate, FIGS. 8A-B show a set of time-series graphs that illustrate the application of an example pair of anomaly thresholds for a given data operating variable. In the example of FIG. 8A, a time-series graph of a given operating variable is illustrated. In the example of FIG. 8A, an original signal for the given operating data variable is illustrated in dark gray. Also illustrated in FIG. 8A is a predicted signal for the given operating data, which is illustrated in light gray. The predicted signal may be generated using an unsupervised model for a given operating data variable, as described herein.

The example of FIG. 8B illustrates a graph of a time-series difference signal for the given operating data variable. The difference signal corresponds to the difference between the original and predicted signals for the given operating data variable. Also illustrated in FIG. 8B are upper and lower deviation bounds for the given operating data variable. The upper deviation bound is illustrated as the upper horizontal dashed line 802 at the value of +1.33, and the lower deviation bound is illustrated as the lower horizontal dashed 804 line at the value of −1.33. Also illustrated in FIG. 8B are upper and lower anomaly thresholds for the given operating data variable, which are calculated based on upper deviation bound 802 and lower deviation bound 804, respectively. In the example of FIG. 8B, upper deviation bound 802 and lower deviation bound 804 are multiplied by 3 to produce the upper anomaly threshold 806 at the value of +4, and the lower anomaly threshold 808 at the value of −4, respectively.

As shown in the example of FIG. 8B, the difference signal exceeds upper deviation bound 802 or lower deviation bound 804 at various points, but the difference signal does not exceed either the upper anomaly threshold 806 or the lower anomaly threshold 808 at any point. Therefore, FIG. 8B does not illustrate the detection of any anomalies from the difference signal. In practice, a difference signal may exceed the upper and/or lower anomaly thresholds relatively infrequently, because in most implementations, the upper and lower anomaly threshold values may be some multiple (e.g., ×3) above a statistical measure of the width of the distribution of residual signal data. However, other implementations are possible as well.

After the data analytics platform 102 has defined the initial set of anomaly thresholds for fleet 106, the data analytics platform 102 may also optionally validate the initial set of anomaly thresholds using the original set of historical operating data for the assets in the first subset, which includes the historical operating data associated with known prior failure occurrences. This validation process may take various forms.

According to one implementation, the process of validating the initial set of anomaly thresholds using the original set of historical operating data for the assets in the first subset may involve at least the following functions for each asset in the first subset.

First, the data analytics system 102 may input the asset's full set of historical operating data into the unsupervised failure model created for the asset and thereby produce a predicted version of the asset's full set of historical operating data, which is then compared against the original version of the asset's full set of historical operating data such that the difference between the original and predicted versions of the asset's full set of historical operating data is determined.

Second, the data analytics system 102 may apply the initial set of anomaly thresholds to the difference between the original and predicted versions of the asset's full set of historical operating data to check for any anomalies detected by the initial set of anomaly thresholds, which are points in the asset's full set of historical operating data where the amount of difference between the asset's captured values for at least one operating data variable and the unsupervised failure model's prediction of such captured values exceeds an upper or lower anomaly threshold for the at least one operating data variable. To the extent that any such anomaly is detected, then in line with the discussion above, the data analytics platform 102 may consider the time at which the anomaly is detected to be a start time of a possible failure occurrence.

Third, the data analytics system 102 may compare the one or more times at which the initial set of anomaly thresholds detected an anomaly in the asset's full set of historical operating data to the failure start time(s) for the known prior failure occurrence(s) of the asset (which were previously determined as part of block 706 described above).

Fourth, based on this comparison, the data analytics system 102 may evaluate the accuracy of the initial set of anomaly thresholds for identifying anomalies that are suggestive of an impending occurrence of a failure. For example, the data analytics system 102 may consider how many "false positives" are detected by the initial set of anomaly thresholds, which are instances where the initial set of anomaly thresholds identified an anomaly that does not correspond to a known prior failure occurrence at an asset in the first subset. As another example, the data analytics system 102 may consider how many "false negatives" are detected by the initial set of anomaly thresholds, which are instances where the initial set of anomaly thresholds failed to identify an anomaly that corresponded to a known prior failure occurrence at an asset in the first subset. Based on the extent of false positives and/or false negatives detected, the data analytics platform 102 may then make a decision as to whether the initial set of anomaly thresholds are considered to be sufficiently accurate.

The foregoing implementation for validating the initial set of anomaly thresholds using the original set of historical operating data for the assets in the first subset may take various other forms as well, including the possibility that functions may be added, removed, combined, and/or reordered. Further, other implementations for validating the initial set of anomaly thresholds using the original set of historical operating data for the assets in the first subset may also be used.

If the data analytics platform 102 decides based on its evaluation that the initial set of anomaly thresholds is not sufficiently accurate, the data analytics platform 102 may also modify the initial set of anomaly thresholds in an effort to improve the accuracy. The data analytics platform 102 may perform this function in various manners.

As one possibility, if the data analytics platform 102 detects that there are too many false positives being detected for a given operating data variable, the data analytics platform 102 may increase the upper and/or lower anomaly threshold for the given operating variable (e.g., by increasing the applicable multiplication factor) such that less anomalies are detected based on the given operating variable. As another possibility, if the data analytics platform 102 detects that there are too many false negatives being detected for a given operating data variable, the data analytics platform 102 may decrease the upper and/or lower anomaly threshold for the given operating variable (e.g., by decreasing the applicable multiplication factor) such that more anomalies are detected based on the given operating variable. The data analytics platform 102 may modify the initial set of anomaly thresholds in other manners as well.

After the data analytics system 102 has determined the set of deviation bounds for the first subset of assets and then used that set of deviation bounds as a basis for defining the initial set of anomaly thresholds for fleet 106, the data analytics system 102 may then proceed to the second phase 602.

2. Classifying the Remaining Assets in the Given Fleet

The second phase 602 of the disclosed approach is generally directed to classifying the remaining assets in fleet 106 into a second subset including any asset that has at least one suspected prior failure occurrence and a third subset including any asset that does not have any known or suspected prior failure occurrences. This second phase 602 may take various forms and be carried out in various manners.

At a high level, this phase may involve (a) analyzing historical operating data for the remaining assets in fleet 106 (i.e., assets in fleet that are not in the first subset) to identify any assets in fleet 106 suspected to have at least one prior failure occurrence, (b) classifying the identified assets as being part of the second subset of assets, and then (c) classifying all other remaining assets in fleet as being part of the third subset of assets. Each of these functions may take various forms.

Figure 9:
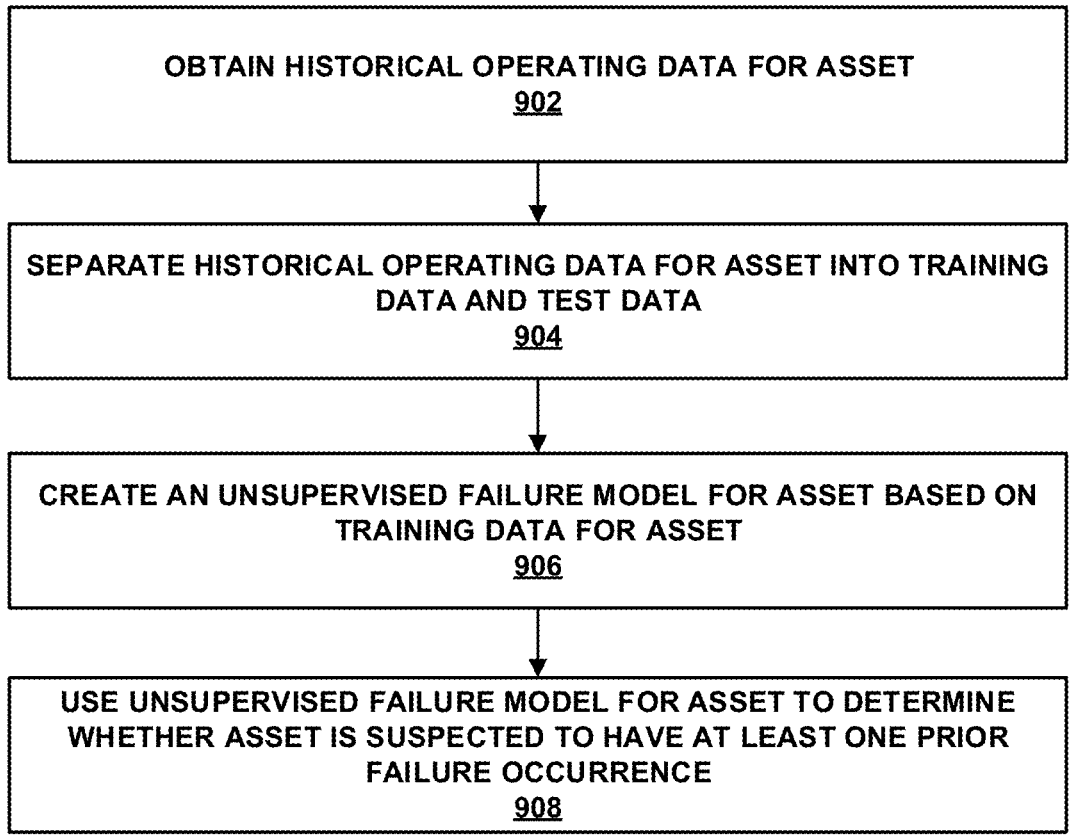
FIG. 9 a flow diagram showing some example functions that may be carried out as part of the second phase of the disclosed approach in order to identify whether a remaining asset in a fleet is suspected to have at least one prior failure occurrence.

Turning now to FIG. 9, a flow diagram 900 is provided to illustrate some example functions that may be carried out as part of the second phase 602 in order to identify whether a given remaining asset in fleet 106 is suspected to have at least one prior failure occurrence. As with FIG. 6, these example functions are described as being carried out by the data analytics platform 102, but some or all of the example functions could be performed by systems other than the platform or which work in conjunction with the platform. Further, while these example functions are described with reference to a single asset, it should be understood that the example functions may be carried out for each of remaining assets in fleet 106, so that the entire subset of assets having at least one suspected prior failure occurrence can be identified. Further yet, it should be understood that flow diagram 900 is provided for sake of clarity and explanation and that numerous other combinations of functions may be utilized to classify the remaining assets in a fleet of assets—including the possibility that example functions may be added, removed, rearranged into different orders, combined into fewer blocks, and/or separated into additional blocks depending upon the particular embodiment.

As shown in FIG. 9, an example process for identifying whether a given remaining asset in fleet 106 is suspected to have at least one prior failure occurrence may begin at block 902 with the data analytics platform 102 obtaining historical operating data for the given remaining asset that includes values for operating data variables. The data analytics platform 102 may perform this function in various manners. As one example, the data analytics platform 102 may already have historical operating data for the given remaining asset stored in data storage, in which case the data analytics platform 102 may access the historical operating data from data storage. As another example, the data analytics platform 102 may request the historical operating data for the given remaining asset from another entity (e.g., the assets themselves, an intermediate system that aggregates and stores historical operating data, etc.) and may then receive the historical operating data in response to this request. The data analytics platform 102 may obtain historical operating data for given remaining asset in other manners as well.

At block 904, the data analytics platform 102 may then separate the given remaining asset's historical operating data into: (1) a first time range of the historical operating data, which may be referred to as the "training data" for the given remaining asset, and (2) a second time range of the historical operating data, which may be referred to as the "test data" for the given remaining asset. In this respect, the data analytics platform 102 may select the time ranges that are used to separate out the given remaining asset's historical operating data in various manners. As one possible example, the first time range that defines the training dataset may comprise the first half of the entire time range for the historical operating data, and the second time range that defines the test dataset may comprise the second half of the entire time range for the historical operating data (e.g., in a 2-year range of historical operating data for the given remaining asset, the first year defines the training dataset and the second year defines the test dataset). However, numerous other examples are possible as well, including the possibility that the training dataset and the test dataset for the given remaining asset may at least partially overlap. In other embodiments, it is also possible that the data analytics platform 102 uses the entire range of historical operating data for the given remaining asset as training data, test data, or both.

At block 906, the data analytics platform 102 may create an unsupervised failure model for the given remaining asset based on the given remaining asset's training data. As with the unsupervised failure models created for the assets in the first subset, the unsupervised failure model created for the given remaining asset may take various forms. In one possible example, the unsupervised failure model created for the given remaining asset may be a regression model, such as a PCA-based model. In such an example, the data analytics platform 102 may first create the PCA-based model for given remaining asset by using the given remaining asset's training data to create a PCA space, which is defined by an asset-specific set of PCs. However, the type of unsupervised failure model created for the given remaining asset and particular process employed to create the unsupervised failure model for the given remaining asset may take various other forms as well.

At block 908, the data analytics platform 102 may use the unsupervised failure model created for the given remaining asset to determine whether the given remaining asset is suspected to have at least one prior failure occurrence. In accordance with the present disclosure, there at least two different techniques that the data analytics platform 102 may employ to make this determination.

According to a first technique, the data analytics platform 102 may determine whether the given remaining asset is suspected to have at least one prior failure occurrence by (a) determining a set of asset-specific deviation bounds for the given remaining asset, (b) evaluating the difference between the given asset's set of asset-specific deviation bounds and the set of deviation bounds for the first subset of assets (which were determined in the second phase 602), and (c) if the evaluation indicates that the given asset's set of asset-specific deviation bounds meaningfully differs from the set of deviation bounds for the first subset of assets, determining that the given remaining asset is suspected to have at least one prior failure occurrence.

Under this first technique, the process of determining the set of asset-specific deviation bounds for the given remaining asset may take various forms. For instance, according to one implementation, this process may involve (a) inputting the given remaining asset's training data into the unsupervised failure model created for the given remaining asset and thereby produce a predicted version of the given remaining asset's training data, (b) evaluating the difference between the original version of the given remaining asset's training data and the predicted version of the given remaining asset's training data for each relevant operating data variable, (c) based on the difference between the original and predicted versions of the given remaining asset's training data for each relevant operating data variable, determining a respective pair of upper and lower deviation bounds for each relevant operating data variable, and (d) compiling the respective pairs of upper and lower deviation bounds for the relevant operating data variables into a single set of asset-specific deviation bounds for the given remaining asset.

In this respect, the process of determining the set of asset-specific deviation bounds for the given remaining asset may be similar to the process of determining a set of asset-specific deviation bounds for an asset in the first subset, which is described in further detail above. However, the process of determining the set of asset-specific deviation bounds for the given remaining asset may also differ from the process of determining a set of asset-specific deviation bounds for an asset in the first subset in certain respects. As one example, it is possible that the function of determining a deviation bound for a given operating data variable may differ for the given remaining asset as compared to an asset in the first subset (e.g., instead of selecting a maximum difference value as the deviation bound, an aggregated difference value may be calculated and used as the deviation bound). For instance, process of determining a deviation bound for a given operating data variable may involve determining the upper deviation bound as the 95th percentile statistic of the difference signal, and the lower deviation bound as the 5th percentile statistic of the difference signal for the given operating data variable. Other examples are possible as well.

Further, under this first technique, the function of determining whether the given asset's set of asset-specific deviation bounds meaningfully differs from the set of deviation bounds for the first subset of assets may also take various forms. According to one possible implementation, this function may involve determining whether the given asset's set of asset-specific deviation bounds includes at least one deviation bound that differs from its corresponding deviation bound in the initial set by a threshold amount. According to another possible implementation, this function may involve determining whether the given asset's set of asset-specific deviation bounds includes a threshold number of deviation bounds that differ from their corresponding deviation bound in the initial set by a threshold amount. The determination of whether the given asset's set of asset-specific deviation bounds meaningfully differ from the set of deviation bounds for the first subset of assets may involve other types of evaluations as well.

The first technique for determining whether the given remaining asset is suspected to have at least one prior failure occurrence may take other forms as well, including the possibility that functions may be added, removed, combined, and/or reordered.

Turning to the second technique, the data analytics platform 102 may determine whether the given remaining asset is suspected to have at least one prior failure occurrence by (a) inputting the given remaining asset's test data (as opposed to the training data) into the unsupervised failure model created for the given remaining asset and thereby producing a predicted version of the given remaining asset's test data (e.g., by projecting the training data into the PCA space and then inversely projecting the training data back to the original space), (b) compare the predicted version of the given remaining asset's test data against the original version of the given remaining asset's test data and thereby determine the difference between the original and predicted versions of the given remaining asset's test data, (c) applying the initial set of anomaly thresholds for fleet 106 (which were determined in the second phase 602 based on the set of deviation bounds for the first subset) to the difference between the original and predicted versions of the given remaining asset's test data to check for any anomalies detected at the asset by the initial set of anomaly thresholds, and (d) if one or more anomalies are detected in the given remaining asset's test data when using the initial set of anomaly thresholds for fleet 106, determining that the given remaining asset is suspected to have at least one prior failure occurrence.

This second technique for determining whether the given remaining asset is suspected to have at least one prior failure occurrence may also take other forms, including the possibility that functions may be added, removed, combined, and/or reordered.

In accordance with the present disclosure, the data analytics platform 102 may employ one or both of these techniques to determine whether the given remaining asset is suspected to have at least one prior failure occurrence. For instance, in one implementation, the data analytics platform 102 may be configured to employ both techniques and may then determine that the given remaining asset is suspected to have at least one prior failure occurrence as long as one of the two techniques indicates this to be the case. It is also possible that the data analytics platform 102 may determine whether the given remaining asset is suspected to have at least one prior failure occurrence using other techniques.

For instance, the data asset platform 102 may determine whether the given remaining asset is suspected to have at least one prior failure occurrence when either one or the other of the aforementioned methods indicate that a failure is suspected. For instance, the data analytics platform 102 may separate portions of the asset data into two subsets: (1) new training data and (2) new testing data, and may then re-apply the first and second techniques for determining whether a prior failure occurrence is suspected to the new training and test data. If the output of either of the two techniques indicates that a failure is suspected, then the data analytics platform 102 may determine that there is an increased likelihood of at least one prior failure. The data analytics platform 102 may continue the process of separating the asset data into new training data and asset data portions and then re-applying the first and second failure detection techniques multiple times until a sufficient likelihood of a prior failure occurrence has been reached or until the failure likelihood is sufficiently low to conclude that a previous failure occurrence has likely not occurred.

As a result of carrying out the functions of FIG. 9 for each of the remaining assets in fleet 106 (i.e., assets in fleet that are not in the first subset), the data analytics platform 102 may identify any asset in fleet 106 that is suspected to have at least one prior failure occurrence. In turn, the data analytics platform 102 may classify the identified assets as being part of the second subset of assets, and may classify all other remaining assets in fleet 106 as being part of the third subset of assets.

After the data analytics system 102 has classified the remaining assets in fleet 106 into the second and third subsets, the data analytics system 102 may then proceed to the third phase 603 of the disclosed approach.

3. Defining a Final Set of Anomaly Thresholds for the Given Fleet

The third phase 603 of the disclosed approach is generally directed to defining a final set of anomaly thresholds for fleet 106 based on the deviation bounds for the first and third subsets of assets (which were previously determined in the first and second phases of the disclosed approach). This third phase 603 may take various forms and be carried out in various manners.

Figure 10:
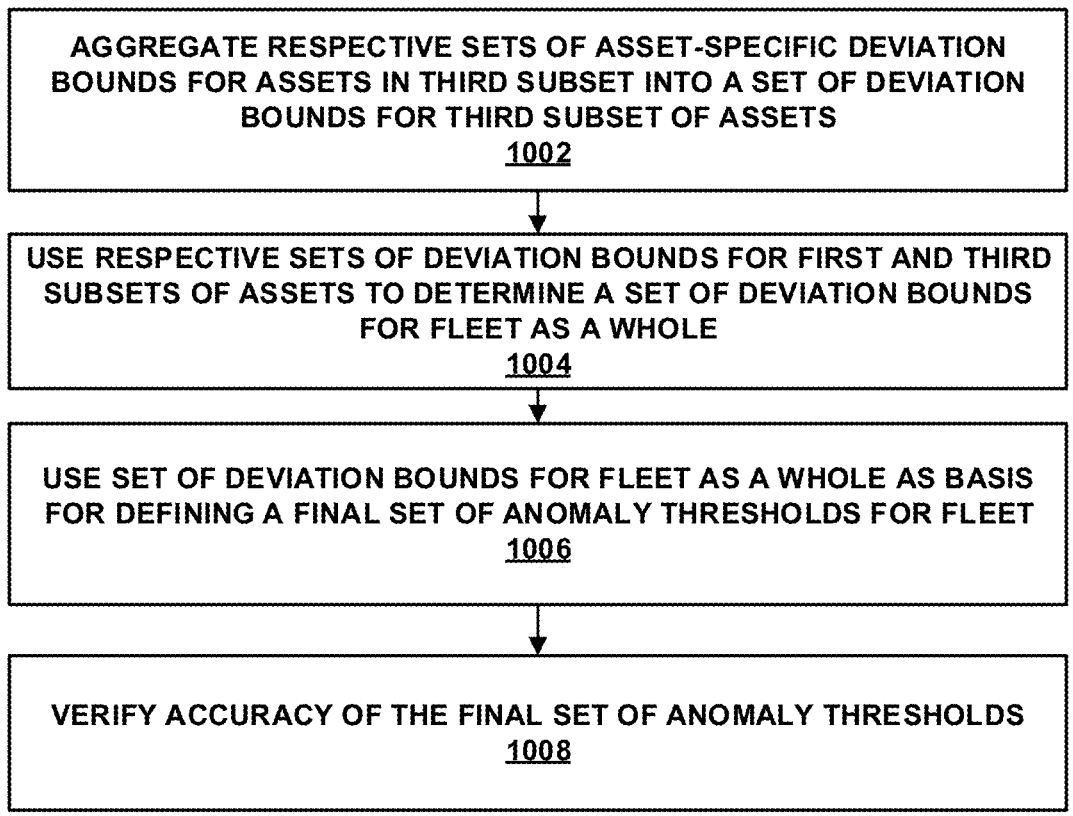
FIG. 10 a flow diagram showing some example functions that may be carried out as part of the third phase of the disclosed approach in order to define a final set of anomaly thresholds for a fleet of assets.

FIG. 10 is a flow diagram 1000 showing some example functions that may be carried out as part of the third phase 603 of the disclosed approach in order to define a final set of anomaly thresholds for fleet 106. As with FIG. 6, these example functions are described as being carried out by the data analytics platform 102, but some or all of the example functions could be performed by systems other than the platform or which work in conjunction with the platform. Further, it should be understood that flow diagram 1000 is provided for sake of clarity and explanation and that numerous other combinations of functions may be utilized to define a final set of anomaly thresholds for a fleet of assets—including the possibility that example functions may be added, removed, rearranged into different orders, combined into fewer blocks, and/or separated into additional blocks depending upon the particular embodiment.

As shown in FIG. 10, the third phase 603 of the disclosed approach may begin at block 1002 with the data analytics platform 102 taking the respective sets of asset-specific deviation bounds for the assets in the third subset—which were determined as part of the second phase 602—and aggregating them into a single set of aggregated deviation bounds for the third subset of assets. This aggregating function may take various forms.

As one possible example, the data analytics platform 102 may iterate through each relevant operating data variable, and for each such relevant operating data variable, the data analytics platform 102 may (a) aggregate the assets' respective upper deviation bounds for the relevant operating data value (e.g., by calculating a percentile statistic, mean, median, mode, weighted average, etc. of the assets' respective upper deviation bounds) into a single, aggregated upper deviation bound for the relevant operating data variable and (b) aggregate the assets' respective lower deviation bounds for the relevant operating data value (e.g., by calculating a percentile statistic, mean, median, mode, weighted average, etc. of the assets' respective upper deviation bounds) into a single, aggregated lower deviation bound for the relevant operating data variable. In turn, the data analytics platform 102 may compile the aggregated upper and lower deviation bounds for each operating data variable into a single set of deviation bounds, which may be used as the set of deviation bounds for the third subset of assets. However, the data analytics platform 102 may aggregate the respective sets of asset-specific deviation bounds for the assets in the third subset into a single set of aggregated deviation bounds in other manners as well.

At block 1004, the data analytics platform 102 may then use the respective sets of deviation bounds for the first and third subsets of assets to determine a set of deviation bounds for fleet 106 as a whole. This data analytics platform 102 may carry out this function in various manners.

In one possible implementation, the data analytics platform 102 may iterate through each relevant operating data variable, and for each such relevant operating data variable, the data analytics platform 102 may (a) aggregate the respective upper deviation bounds of the first and third subsets for the relevant operating data value (e.g., by calculating a percentile statistic, mean, median, mode, weighted average, etc. of the subsets' respective upper deviation bounds) into a single, aggregated upper deviation bound for the relevant operating data variable and (b) aggregate the respective lower deviation bounds of the first and third subsets for the relevant operating data value (e.g., by calculating a percentile statistic, mean, median, mode, weighted average, etc. of the subsets' respective upper deviation bounds) into a single, aggregated lower deviation bound for the relevant operating data variable. In turn, the data analytics platform 102 may compile the aggregated upper and lower deviation bounds for each operating data variable into a single set of deviation bounds, which may be used as the set of deviation bounds for fleet 106 as a whole.

In another possible implementation, the data analytics platform 102 may iterate through each relevant operating data variable, and for each such relevant operating data variable, the data analytics platform 102 may (a) select between the respective upper deviation bounds of the first and third subsets for the relevant operating data value and (b) select between the respective lower deviation bounds of the first and third subsets for the relevant operating data value. In this respect, the platform's selection may be based on which deviation is higher or lower, or may be based on some other criteria or algorithm. In turn, the data analytics platform 102 may compile the selected upper and lower deviation bounds for each operating data variable into a single set of deviation bounds, which may be used as the set of deviation bounds for fleet 106 as a whole.

The function of determining the set of deviation bounds for fleet 106 based on the respective sets of deviation bounds for the first and third subsets of assets may take various other forms as well.

Turning to block 1006, the data analytics platform 102 may then use the determined set of deviation bounds for fleet 106 as a whole as the basis for defining a final set of anomaly thresholds for fleet 106. This function may take various forms.

As one possible implementation, the data analytics platform 102 may define the final set of anomaly thresholds by multiplying each deviation bound in the determined set by a respective multiplication factor, which may be selected based on (1) which operating data variable is at issue and/or (2) whether it is an upper or lower bound at issue, among other factors. In this respect, the multiplication factors used to define the anomaly thresholds in the final set may be similar in nature to the multiplication factors used to define the anomaly thresholds in the initial set, in that the multiplication factors may be different for the upper and lower bounds, may differ across different operating data variables, may generally have a value of greater than 1, and may be set in various manners. In fact, in some implementations, the multiplication factors used to define the anomaly thresholds in the final set may be the same as the multiplication factors used to define the anomaly thresholds in the initial set, although in other implementations the multiplication factors may differ.

The function of using the determined set of deviation bounds for fleet 106 as the basis for defining a final set of anomaly thresholds for fleet 106 may take various other forms as well.

At block 1008, after defining the final set of anomaly thresholds, the data analytics platform 102 may also verify the accuracy of this final set of anomaly thresholds. The data analytics platform 102 may carry out this verification process in various manners.

According to one implementation, the data analytics platform 102 may begin the verification process by carrying out the following functions for each asset in the first subset: (a) applying the final set of anomaly thresholds to the difference between the original and predicted versions of the asset's historical operating data to check for any anomalies detected by the final set of anomaly thresholds, (b) comparing the one or more times at which the final set of anomaly thresholds detect an anomaly in the asset's historical operating data to the one or more failure start times for the one or more known prior failure instance of the asset, and (c) based on this comparison, identifying any false positives and/or false negatives detected at the asset by the final set of anomaly thresholds.

Similarly, the data analytics platform 102 may carry out the following functions for each asset in the third subset: (a) applying the final set of anomaly thresholds to the difference between the original and predicted versions of the asset's historical operating data to check for any anomalies detected by the final set of anomaly thresholds, and then (b) to the extent the final set of anomaly thresholds detect any anomalies in the asset's historical operating data, identifying each such anomaly as a false positive that has been detected at the asset by the final set of anomaly thresholds (because assets in the third subset are presumed to not have any known or suspected prior failure occurrences).

After carryout out the foregoing functions, the data analytics platform 102 may evaluate the overall extent of false positives and/or false negatives produced by the final set of anomaly thresholds to determine whether the final set of anomaly thresholds is sufficiently accurate.

If the data analytics platform 102 determines based on its evaluation that the final set of anomaly thresholds is not sufficiently accurate, the data analytics platform 102 may modify the final set of anomaly thresholds in an effort to improve the accuracy of one or more unsupervised models. The data analytics platform 102 may perform this function in various manners.

As one possibility, if the data analytics platform 102 detects that there are too many false positives being detected for a given operating data variable, the data analytics platform 102 may increase the upper and/or lower anomaly threshold for the given operating variable (e.g., by increasing the applicable multiplication factor) such that less anomalies are detected based on the given operating variable. As another possibility, if the data analytics platform 102 detects that there are too many false negatives being detected for a given operating data variable, the data analytics platform 102 may decrease the upper and/or lower anomaly threshold for the given operating variable (e.g., by decreasing the applicable multiplication factor) such that more anomalies are detected based on the given operating variable.

While performing these functions, the data analytics platform 102 may assign false positives and false negatives equal priority, and may thus attempt to reduce the overall extent of false positives and false negatives. Alternatively, the data analytics platform 102 may assign one of false positives and false negatives a higher priority than the other. For example, reducing false negatives may be assigned a higher priority than reducing false negatives, so as to reduce the chances of a failure being missed. In such an example, the data analytics platform 102 may modify the final set of anomaly thresholds in an effort to minimize the extent of false negatives in the first instance, and may then to the extent possible, may attempt to reduce the extent of false positives while maintaining that minimized extent of false negatives. The data analytics platform 102 may modify the final set of anomaly thresholds in other manners as well.

As part of the verification process described above, the data analytics platform 102 may also determine that one or more assets in the third subset appear to have at least one suspected prior failure occurrence, and should thus be re-classified from the third subset of assets to the second subset of assets. The data analytics platform 102 may make this determination in various manners.

As one possible example, the data analytics platform's determination that an asset in the third subset appears to have at least one suspected prior failure occurrence may be based on a determination that the extent of anomalies detected for the asset when using the final set of anomaly thresholds exceeds a threshold extent. As another example, the data analytics platform's determination that an asset in the third subset appears to have at least one suspected prior failure occurrence may be based on a determination that at least one anomaly detected at the asset was based on a difference between the original and predicted versions of the asset's historical asset data that significantly exceeded the anomaly threshold. The data analytics platform 102 may determine that an asset in the third subset appears to have at least one suspected prior failure occurrence in other manners as well.

In response to determining that one or more assets in the third subset appear to have at least one suspected prior failure occurrence, the data analytics platform 102 may then re-classify the one or more assets from the third subset to the second subset.

After defining a final set of anomaly thresholds for fleet 106 and potentially re-classifying certain assets from the third subset to the second subset, the data analytics system 102 may then proceed to the fourth phase 604.

4. Using the Final Set of Anomaly Thresholds to Identify Failure Occurrences in the Fleet The fourth phase 604 of the disclosed approach is generally directed to using the final set of anomaly thresholds to identify failure occurrences in fleet 106. This fourth phase 604 may take various forms and be carried out in various manners.

The fourth phase 604 of the disclosed approach may begin with the data analytics platform 102 selecting which assets in fleet 106 are to be used to train the supervised failure model to be created for fleet 106. As a starting point, the data analytics platform 102 will preferably select some or all of the assets in the first subset, because such assets each have at least one known prior failure occurrence. In addition, the data analytics platform 102 may optionally select some or all of the assets in the second subset, because such assets each have at least one suspected prior failure occurrence. However, the assets that are selected for use in training the supervised failure model may take other forms as well.

After selecting which assets are to be used to train the supervised failure model, then for each selected asset, the data analytics platform 102 may (a) determine (or obtain from data storage, if available) the difference between the original version of the selected asset's historical operating data and the predicted version of the asset's historical operating data output by the unsupervised failure model created for the selected asset, (b) apply the final set of anomaly thresholds for fleet 106 to the difference between the original and predicted versions of the selected asset's historical operating data to check for any anomalies detected at the selected asset by the final set of anomaly thresholds, (c) identify the time at which each detected anomaly occurred at the selected asset by the final set of anomaly thresholds.

As a result of carrying out these functions for each asset, the data analytics platform 102 may compile a list of anomalies that have been detected at the selected assets when using the final set of anomaly thresholds. In line with the discussion above, data analytics platform 102 may consider each such anomaly to be suggestive of an impending failure occurrence, and may consider the time at which each such anomaly occurred to be a start time for a prior failure occurrence.

In this respect, it should be understood that the anomalies detected at the assets in the first subset may not correlate exactly to the known prior failure occurrences at such assets, but in practice, the final set of anomaly thresholds will preferably be tuned (as described above) to produce a relatively high correlation between the anomalies detected at the assets in the first subset and the known prior failure occurrences. For example, as discussed above, the final set of anomaly thresholds may be tuned to minimize the extent of false negatives at the assets in the first subset, such that an anomaly is detected for nearly every known prior failure occurrence (even at the expense of detecting some false positives). However, the final set of anomaly thresholds may be tuned in other manners and/or to achieve other goals as well.

Further, it should be understood that the failure start times for the anomalies detected for the assets in the first subset may not be the same as to the determined failure start times for the known prior failure occurrences at such assets that were determined and used in the second phase 602 of the disclosed approach. Indeed, the failure start times in this phase of the disclosed approach are being determined based on the asset data platform's further analysis of historical operating data for the particular assets in fleet 106, whereas the failure start times in the second phase 602 of the disclosed approach are typically determined based on more generalized knowledge regarding the physical processes that may lead to the occurrence of a given failure. Thus, in theory, the failure start times determined in this phase of the disclosed approach should be more accurate than the failure start times determined in the second phase 602 of the disclosed approach, which may in turn help to improve the accuracy of a supervised failure model that is created based on this information. (However, it should be understood that there is no guarantee or requirement regarding the accuracy of the failure start times determined in this phase of the disclosed approach).

For each anomaly detected at the selected assets, the data analytics platform 102 may then use the detected anomaly's failure start time as a basis for determining a functional failure time for the detected anomaly. The data analytics platform 102 may make this determination in various manners.

According to one implementation, a subject matter expert may review the output of the unsupervised model to determine the functional failure time. According to another implementation, the data analytics platform 102 may employ an algorithm approach to determine the functional failure time. This algorithmic approach may comprise at least one set of logical rules, which are used to test for various conditions in the operating data. Such conditions may include: (1) a rapid increase in the number of alerts in one or more operating data variable of the unsupervised model, (2) a presence of alerts in more than one operating data variable, or (3) at least one anomaly in one or more of the operating data variables that have been designated as "operating data variables of interest," as some non-limiting examples. If any of these aforementioned conditions are met, the time of the earliest-met condition may constitute the functional failure time.

After identifying the failure occurrences in fleet 106, the data analytics system 102 may then proceed to the fifth phase 605.

5. Categorizing the Identified Failure Occurrences by Type

The fifth phase 605 of the disclosed approach is generally directed to categorizing the identified prior failure occurrences by type. This fifth phase 605 may take various forms and be carried out in various manners.

According to one implementation, the data analytics system 102 may categorize these prior failure occurrences by type based on user input (e.g., input from a subject matter expert). For instance, the user input may involve expert analysis of the data output by the unsupervised model for assets determined and/or suspected to have prior failure occurrences to categorize the failure occurrences by type. Such expert analysis may further involve utilizing well-known failure analysis techniques, such as failure modes and effects analysis, to categorize the prior failure occurrences type.

As another example, the data analytics platform 102 may categorize the prior failure occurrences based on a statistical analysis of data that is maintained by and/or otherwise available to the platform, such as data indicating the relevance of different operating data variables to different types of failures. This statistical analysis of the data may take various forms.

As one possibility, the data analytics platform 102 may begin by evaluating correlations between the universe of operating data variables and different prior failure occurrences. For instance, the data analytics platform 102 may use a technique such as fuzzy (or c-means) clustering, which may identify various different groups of operating data variables or other data (e.g. non-time-series variables) that may be correlated with a given failure type. The data analytics platform 102 may categorize the identified prior failure occurrences by type in various other manners as well.

After categorizing identified prior failure occurrences by type, the data analytics platform 102 may generate a respective set of failure data for each different failure type, which may include (a) indications of prior occurrences of the given failure type that were detected at fleet 106 using the foregoing process and (b) associated information regarding the time of the prior occurrences of the given failure type were detected at fleet 106 using the foregoing process (e.g., the failure start times, functional failure times, etc.). The generated set of failure data for each different failure type may take other forms and/or include other types of information as well.

B. Using the Derived Label Data to Create a Supervised Failure Model

In accordance with the present disclosure, the generated set of failure data for a given failure type may then be used as label data that is input into a process for creating a supervised failure model for the given failure type. This process may take various forms and be carried out in various manners.

At a high level, the process for creating a supervised failure model may involve applying a supervised learning technique to historical operating data for assets in fleet 106 that has been labeled with the failure data for a given failure type in order to create a respective supervised predictive model that configured to predict occurrences of the given failure type at an asset in fleet 106. In this respect, when applying the supervised learning technique to the historical operating data labeled with the failure data for a given failure type, it will preferably be the functional failure time detected for each detected prior occurrence of the given failure type that is considered to be the failure event being predicted by the supervised failure model. However, the failure event being predicted by the supervised failure model may be defined in other manners as well.

Further, the supervised failure model itself may take various forms. In one implementation, the supervised failure model may be configured to receive data for a set of relevant operating data variables (among other data) as the model's inputs and then output data indicating the model's prediction as to the occurrence of a given failure type. In such an implementation, the set of relevant operating data variables may take various forms, examples of which may include sensor and/or actuator measurements, fault codes, derived feature values, asset location data, asset age data, asset usage data, etc. The supervised failure model's inputs may include other types of data as well, such as information regarding the asset's configuration (e.g., the asset's brand, make, model, software version, etc.), among other examples. Likewise, the model's output may take various forms. As one example, the model's output may include an indication of a likelihood that the given failure type will occur at the asset within the foreseeable future (e.g., within the next 2 weeks), such as a probability value ranging from 0 to 100 percent. As another example, the model's output may include a binary bit, a flag, or the like that specifies whether or not the model is predicting the occurrence of the given failure type at the asset. The model's output may take other forms as well.

According to one implementation, the data analytics platform 102 may begin the process of creating a supervised model for a respective failure type by selecting a given failure type for which to create a respective supervised failure model. The data analytics platform 102 may make this selection in various manners. As one example, the data analytics platform 102 may select the given failure type based on user input. As another example, the data analytics platform 102 may select the given failure type based on an analysis of data that is maintained by and/or otherwise available to the platform, such as data indicating the failure types for which supervised failure models have not yet been created. The data analytics platform 102 may select the given failure type for which to create the supervised failure model in other manners as well.

Once the data platform 102 has selected the given failure type for which to create the respective supervised model, the data analytics platform 102 may then obtain the failure data for the given failure type. This failure data may be obtained from the foregoing process. As one example, the failure data may comprise functional failure times for assets known or suspected to have prior failure occurrences the given failure type. As some other examples, the failure data may more broadly comprise historical operating data associated with assets having known or suspected prior failure occurrences of the given failure type. Additionally, the failure data may comprise normal operating data that is associated with normal periods of operation in addition to the historical operating data for assets known or suspected of having prior failure occurrences of the given failure type. The failure data may take various other forms as well.

Once the data analytics platform 102 selects the given failure type, the data analytics platform 102 may then select a corresponding set of operating data variables that are relevant to the given failure type. The data analytics platform 102 may make this selection in various manners.

As one example, starting with the universe of operating data variables included in the operating data received from assets in the fleet, the data analytics system 102 may select a set of operating data variables that are relevant to the respective failure type. In one example, the data analytics system 102 may make this selection based on user input (e.g., input from a subject matter expert). For instance, the user may utilize well-known failure analysis techniques, such as failure modes and effects analysis, to select the operating data variables.

As another example, the data analytics platform 102 may make this selection based on an analysis of data that is maintained by and/or otherwise available to the platform, such as data indicating the relevance of different operating data variables to different types of failures. For instance, the asset data platform 102 may utilize statistical techniques to determine relevance of different operating data variables, including techniques that measure the probabilistic relevance of data variables which allow removal of variables of low relevance from inclusion in the supervised model. The data analytics platform 102 may select the initial set of operating data variables that are relevant to the given failure type in other manners as well.

After making its initial selection of the set of operating data variables that are relevant to the given failure type, the data analytics system 102 may optionally consider whether to expand the set of operating data variables to include other operating data variables that have some correlation with the operating data variables included in the set. The data analytics system 102 may carry out this optional function in various manners.

As one possibility, the data analytics platform 102 may begin by evaluating correlations between the universe of operating data variables received from the assets in fleet 106 using a technique such as fuzzy (or c-means) clustering, which may identify various different correlated groups of operating data variables. In this respect, it should be understood that the correlated groups of operating data variables are typically not mutually exclusive; rather, a given operating data variable may appear in multiple different correlated groups, particularly if that operating data variable is relevant to the operation of multiple different subsystems (e.g., ambient air temperature). Once the different correlated groups of operating data variables have been identified, the data analytics platform 102 may then identify the correlated groups containing at least one operating data variable that is already included in the set of operating variables. In turn, the data analytics platform 102 may expand the set of operating variables to include some or all of the other operating data variables in such correlated groups (e.g., the set of operating data variables may be expanded to include the superset of all operating data variables included in such correlated groups. The data analytics system 102 may expand the set of relevant operating data variables in other manners as well.

After identifying the set of relevant operating variables, the data analytics platform 102 may obtain historical operating data for use in creating a supervised failure model for the given failure type. This historical operating data may take various forms.

For instance, the data analytics platform 102 may obtain historical operating data associated with each prior occurrence of the given failure type that was detected using the foregoing process. In this respect, the historical operating data associated with each prior occurrence of the given failure type detected at an asset in fleet 106 may include the asset's data values for the set of relevant operating data variables from a time period that begins at or around the failure start time for the prior occurrence of the given failure type and ends at or around the functional failure time for the prior occurrence of the given failure type. However, the historical operating data for each prior occurrence of the given failure type may take other forms as well, including the possibility that the time period for historical operating data includes a certain amount of time before the failure start time and/or after the functional failure time.

Additionally, the data analytics platform 102 may also identify normal operating data (i.e. operating data not associated with a fault) for training of the given supervised model. In some examples, the data analytics platform 102 may obtain this normal operating data prior to the failure start time. As another example, the asset data platform 102 may obtain this normal operating data from the third subset of assets, which are not suspected of having a prior failure occurrence.

Once the data analytics platform 102 obtains the failure data and historical operating data associated with each prior occurrence of the given failure type, the data analytics platform 102 may then apply a supervised learning technique to this data in order to create the supervised failure model. The particular supervised learning technique used may take various forms, examples of which may include a regression technique (e.g., logistical regression), a random forest technique, a support vector machines (SVM) technique, a Bayesian technique, and a survival analysis technique (e.g., a Cox proportional hazard technique), among others.

Figure 11:
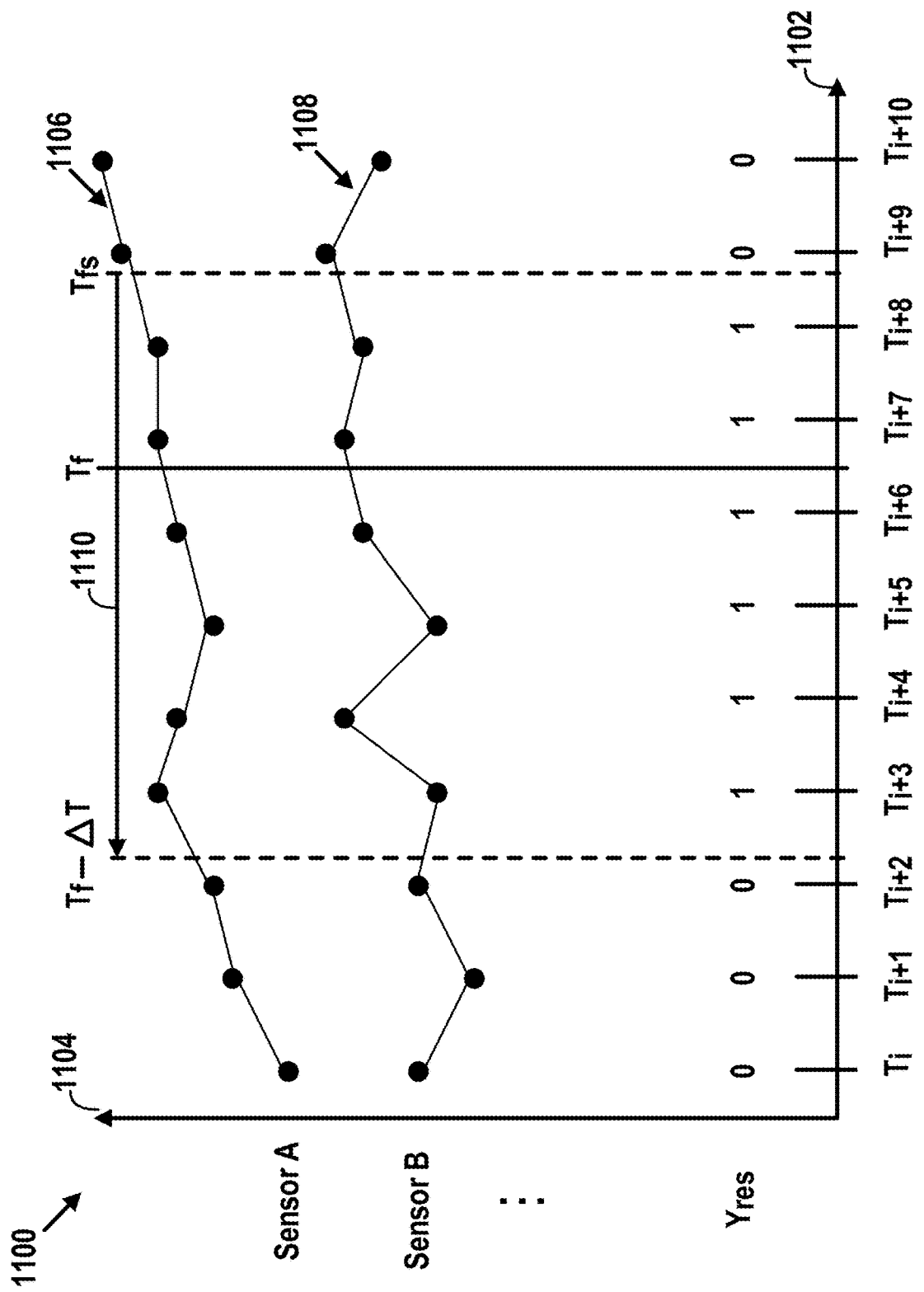
FIG. 11 is a conceptual illustration of historical operating data that may be analyzed when creating a supervised failure model.

To help illustrate the foregoing process, FIG. 11 depicts a conceptual illustration of historical operating data that the data analytics platform 102 may analyze when creating the supervised failure model. Plot 1100 may correspond to a segment of historical operating data that originated from two sensors at a given selected asset, which are designated as "Sensor A" and "Sensor B." As shown, the plot 1100 includes time on the x-axis 1102, sensor measurement values on the y-axis 1104, and sensor data 1106 corresponding to Sensor A and sensor data 1108 corresponding to Sensor B, each of which includes various data-points representing sensor measurements at particular points in time, $T_i$. Moreover, the plot 1100 includes an indication of a prior occurrence of a given type failure having a functional failure time $T_f$ (as specified in the label data) and an indication of an amount of time before the functional failure time that is considered to be relevant to the prior occurrence of the given failure type, which is denoted as $\Delta T$. In some instances, the period of time 1110 spanning from $T_f-\Delta T$ to $T_f$ may then be used as the relevant time period when analyzing the historical operating data for the given failure type.

In this respect, when the supervised learning process begins, the data analytics platform 102 may use the failure start time included in the label data to set the value for $T_f-\Delta T$ and then derive the value for $\Delta T$ by calculating the difference between the functional failure time and the failure start time for the prior occurrence of the given type failure. However, as the supervised learning process proceeds, the value of $\Delta T$ (and thus the effective failure start time) may be varied to find a value that best matches the patterns in historical operating data associated with the prior occurrences of the given failure type.

In the example of FIG. 11, the plot 1100 for a given asset may also possibly include a "failure stop time" from the historical operating which is denoted as $T_{fs}$, and which occurs after the functional failure time $T_f$, and which may indicate a time at which the given failure type of the asset ended. In many instances, the failure stop time may not be present, due to a lack of available data.

Whether or not a failure stop time is present is based on whether a given asset may have been repaired to correct the given failure, or whether the given failure resolved itself.

After identifying the respective subsets of historical operating data associated with the prior occurrences of the given failure type, the data analytics platform 102 may then apply a supervised learning technique such as logistic regression, random forest, etc. to this historical operating data to derive a relationship between (1) the values for the set of relevant operating data variables and (2) a likelihood of the given failure type occurring within the foreseeable future (e.g., within the next two weeks). However, the particular supervised learning technique applied and the particular relationship derived may take various other forms.

In one particular example, the process of applying the supervised learning technique may involve generating a response variable based on the identified subsets of historical operating data. Specifically, the data analytics platform 102 may determine an associated response variable for each point in time included in the historical operating data being evaluated. As such, the response variable may take the form of a data set associated with the failure model.

The response variable may indicate whether the values for the relevant operating data variables at each point in time is within any of the periods of time that are considered to be relevant to a prior occurrence of the given failure type. That is, the response variable may reflect whether the values for the relevant operating data variables at a given point in time is relevant to any prior occurrence of the given failure type. This response variable may be a binary-valued response variable such that if the values for the relevant operating data variables at a given point in time is within any of the periods of time that are considered to be relevant to a prior occurrence of the given failure type, the associated response variable is assigned a value of one for the given point in time, and otherwise, the associated response variable is assigned a value of zero.

Returning to FIG. 11, a conceptual illustration of an example response variable vector, $Y_{res}$, is shown on the plot 1100. As shown, respective response variables associated with sensor measurements that are within the time period 1110 have a value of one (e.g., $Y_{res}$ at times $T_{i+3}$-$T_{i+6}$). If there is no failure stop time, the response variables associated with sensor measurements outside the time period 1110 have a value of zero (e.g., $Y_{res}$ at times $T_i$-$T_{i+2}$ and $T_{i+7}$-$T_{i+10}$). Additionally, if a failure stop time $T_s$ is present, response variables between $T_f$ and $T_s$ have a value of one (e.g., $Y_{res}$ at times $T_{i+7}$-$T_{i+10}$). Other response variables are also possible.

In this particular example, the data analytics platform 102 may then train the supervised failure model with the identified subsets of historical operating data associated with the prior occurrences of the given failure type and the generated response variable in order to create a supervised failure model that is configured to receive values captured by Sensors A and B of an asset as the model's inputs and then output data indicating a likelihood that the given failure type will occur at the asset within a period of time into the future that equivalent to the final value of $\Delta T$.

The foregoing process for creating the supervised failure model may take various other forms as well, including the possibility that functions may be added, removed, combined, and/or reordered. Further, other processes for creating the supervised failure model may also be used. Further detailed regarding processes for creating of a supervised failure model may be found in U.S. patent application Ser. No. 14/732,258, which is incorporated herein by reference in its entirety.

C. Use of the Supervised Failure Model

After creating the supervised failure model using the disclosed approach, the data analytics platform 102 may begin applying the supervised failure model to operating data received from assets in fleet 106. For example, after the data analytics platform 102 receives operating data from one or more given assets from a fleet of assets and performs one or more of the data ingestion functions on the received operating data, the data analytics platform 102 may extract the data for the set of relevant operating data variables from the received operating data and input such data into the supervised failure model. In turn, the supervised failure model may apply the supervised failure model to the one or more given assets and output data indicating the model's prediction as to the occurrence of the given failure type at the one or more given assets.

Based on the model's prediction as to the occurrence of the given failure type at the one or more given assets, the data analytics platform 102 may then take one or more actions to help prevent occurrences of the given failure type at the one or more assets before they happen, which may reduce the time, cost, and/or safety risks associated with occurrences of the given failure type. These actions may take various forms.

As one possibility, the data analytics platform 102 may cause a client station to display the results of the supervised failure model's prediction to a user, such as an individual responsible for overseeing the operation of fleet 106. This function of causing the client station to display the results of the model's prediction to a user may take various forms. As one possible example, this function may involve sending data indicating the results of the model's prediction to the client station, which may in turn trigger the client station to display the results of the model's prediction. In such an example, the data analytics platform 102 may send the data indicating the results of the model's prediction periodically according to a schedule, in response to a request from the client station, or at various other times. Upon being presented with the results of the supervised failure model's prediction for a given asset, an individual responsible for overseeing the operation of fleet 106 may then be able to take certain actions to prevent occurrences of the given failure type at the asset before the failure happens, such as by taking the asset out of circulation and/or sending it for repair.

As another possibility, if the data analytics platform 102 determines based on the output of the supervised failure model that the given failure type is likely to occur at the given asset in the foreseeable future, the data analytics platform 102 may cause a client station to present a notification of the predicted occurrence of the given failure type to a particular user, such as an individual responsible for overseeing the operation of fleet 106. This notification may take various forms, examples of which may include a message presented via a GUI interface for the platform, an email, a text message, or the like. Further, the function of causing the client station to present the notification may take various forms. As one possible example, this function may involve sending data that defines the notification to the client station, which may in turn trigger the client station to present the notification to a user of the client station. As with providing the results of the supervised failure model's prediction, providing such a notification may enable an individual responsible for overseeing the operation of fleet 106 to take certain actions to prevent occurrences of the given failure type at an asset before they happen, such as by taking the asset out of circulation and/or sending it for repair.

As yet another possibility, the data analytics platform 102 may send the results of the model's prediction to the given asset, perhaps along with an instruction for the asset to take some action based on the model's prediction. For example, if the data analytics platform 102 determines based on the output of the supervised failure model that the given failure type is likely to occur at the given asset in the foreseeable future, the data analytics platform 102 may send a notification of the predicted occurrence of the given failure type to the given asset, perhaps along with an instruction for the given asset to alter its operation in a manner that may avoid or reduce the impact of the predicted occurrence of the given failure type.

As a further possibility, if the data analytics platform 102 determines based on the output of the supervised failure model that the given failure type is likely to occur at the given asset in the foreseeable future, the data analytics platform 102 may take certain other remedial actions with respect to the predicted occurrence of the given failure type. For example, the data analytics platform 102 may communicate with a work-order system in order to cause a work order to be created for the predicted occurrence of the given failure type. As another example, the data analytics platform 102 may communicate with a parts-ordering system in order to order one or more parts that may be needed to remedy the predicted occurrence of the given failure type. The data analytics platform 102 may take other types of remedial actions as well.

Further detail regarding execution of a supervised failure model's output may be found in U.S. patent application Ser. No. 14/732,258, which is incorporated herein by reference in its entirety.

D. Inputting Operating Data into the Unsupervised Failure Models

The unsupervised failure models and/or failure data resulting from the disclosed process may be used for various other purposes as well. As one possibility, the data analytics platform 102 may input operating data from assets in fleet 106 to the unsupervised failure models that were created during the example process 600. These functions may take various forms and be carried out in various manners.

For example, after the data analytics platform 102 has created the unsupervised failure models as a result of third phase 603, the asset data platform 102 may receive operating data (e.g. recent operating data) from assets in fleet 106. The data analytics platform 102 may input that operating data into the unsupervised failure models for various different purposes.

As a first example, such a purpose may include identifying instances of failure types for which supervised models have not yet been created. In this example, an expert or algorithm may examine the output of the unsupervised failure models to select prior failure occurrences having failure types for which supervised models have not yet been created, may select relevant operating data variables and other variables to train a supervised model for the given failure type, and may then generate a respective supervised model corresponding to the given failure type.

As another example, such a purpose may involve identifying additional fault instances and functional fault times for updated training of existing supervised failure models. In this example, an expert or algorithm may identify additional relevant data for a given pre-existing supervised model. Data analytics platform 102 may then use the identified additional data to train the given one of the supervised models in order to improve the prediction accuracy of the given unsupervised model.

As a third example, such purposes may involve determining additional insights into asset behavior during faults that are developing and which are predicted by a supervised failure model. For instance, the unsupervised model may provide additional insights such as predictions of each of the operating data variables included in the model. A comparison between these predictions with the values of operating data variables may be used to understand how quickly a given asset is progressing to failure and how the failure can affect the behavior of other components in the asset. Further, these insights may be used to understand the 'severity' of the impending fault, thereby enabling the data analytics platform 102 to determine whether the given asset needs to be taken out of service now or at some other time in the future. The process of inputting operating data to the unsupervised failure model may be used for various other purposes as well.

V. CONCLUSION

Example embodiments of the disclosed innovations have been described above. Those skilled in the art will understand, however, that changes and modifications may be made to the embodiments described without departing from the true scope and sprit of the present invention, which will be defined by the claims. For instance, while the time-series modeling approaches disclosed herein have been discussed in the context of predicting failure of an asset, it should also be understood that the disclosed approaches could be used in other contexts as well.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:
1. A computing system comprising:
a network interface configured to facilitate communication with a plurality of assets in a given fleet;
at least one processor;
a non-transitory computer-readable medium; and
program instructions stored on the non-transitory computer-readable medium that are executable by the at least one processor to cause the computing system to create a supervised failure model for assets in the given fleet that is configured to receive operating data as inputs and output a prediction as to an occurrence of a given failure type at an asset of the given fleet, wherein program instructions that are executable to cause the computing system to create the supervised failure model comprise program instructions stored on the non-transitory computer-readable medium that are executable by the at least one processor to cause the computing system to:
identify a first subset of assets in the given fleet that have known prior failure occurrences;
for each asset in the first subset, obtain a respective set of cleaned historical operating data for the asset and then use the respective set of cleaned historical operating data for the asset to create a respective unsupervised failure model for the asset;

use the respective unsupervised failure model for each asset in the first subset to determine a set of deviation bounds for the first subset of assets;

for each remaining asset in the given fleet, obtain a respective set of historical operating data for the asset and then use the respective set of historical operating data for the asset to create a respective unsupervised failure model for the asset;

based on the respective unsupervised failure model for each remaining asset in the given fleet and the set of deviation bounds for the first subset of assets, classify each remaining asset in the given fleet into either a second subset of assets that have suspected prior failure occurrences or a third subset of assets that do not have known or suspected prior failure occurrences;

use the respective unsupervised failure model for each asset in the third subset to determine a set of deviation bounds for the third subset of assets;

based on the respective sets of deviation bounds for the first subset of assets and the third subset of assets, define a set of anomaly thresholds for the given fleet;

apply the set of anomaly thresholds to historical operating data for each of a selected group of assets in the given fleet and thereby detect a set of anomalies that are each suggestive of a prior failure occurrence;

from the set of anomalies, identify a subset of anomalies that are each suggestive of a prior occurrence of the given failure type; and create the supervised failure model using failure data for the identified subset of anomalies.

2. The computing system of claim 1, wherein the program instructions that are executable by the at least one processor to cause the computing system to obtain a respective set of cleaned historical operating data for the asset comprise program instructions stored on the non-transitory computer-readable medium that are executable by the at least one processor to cause the computing system to:

obtain historical operating data for the asset from a given range of time in the past; and remove historical operating data from any period of time within the given range that is associated with a known prior failure occurrence.

3. The computing system of claim 1, wherein the program instructions that are executable by the at least one processor to cause the computing system to use the respective unsupervised failure model for each asset in the first subset to determine a set of deviation bounds for the first subset of assets comprise program instructions stored on the non-transitory computer-readable medium that are executable by the at least one processor to cause the computing system to:

for each asset in the first subset, (1) input the respective set of cleaned historical operating data for the asset into the unsupervised failure model for the asset and thereby produce a corresponding prediction of the respective set of cleaned historical operating data for the asset, (2) evaluate the difference between the respective set of cleaned historical operating data for the asset and the corresponding prediction, and (3) based on the difference, determine a respective set of asset-specific deviation bounds for the asset; and aggregate the respective set of asset-specific deviation bounds for each asset in the first subset to produce the set of deviation bounds for the first subset of assets.

4. The computing system of claim 1, wherein the program instructions that are executable by the at least one processor to cause the computing system to classify each remaining asset in the given fleet into either the second subset of assets or the third subset of assets comprise program instructions stored on the non-transitory computer-readable medium that are executable by the at least one processor to cause the computing system to:

for each remaining asset, (a) use the respective unsupervised failure model for the asset to determine a set of asset-specific deviation bounds for the asset, (b) compare the set of asset-specific deviation bounds for the asset to the set of deviation bounds for the first subset of assets, and (c) based on the comparison, classify the asset into (1) the second subset of assets if the set of asset-specific deviation bounds for the asset meaningfully differs from the set of deviation bounds for the first subset of assets and (2) the third subset of assets if the set of asset-specific deviation bounds for the asset does not meaningfully differ from the set of deviation bounds for the first subset of assets.

5. The computing system of claim 1, wherein the set of anomaly thresholds defined based on the respective sets of deviation bounds for the first subset of assets and the third subset of assets comprises a final set of anomaly thresholds, the computing system further comprising program instructions stored on the non-transitory computer-readable medium that are executable by the at least one processor to cause the computing system to:

based on the set of deviation bounds for the first subset of assets, define an initial set of anomaly thresholds.

6. The computing system of claim 5, wherein the program instructions that are executable by the at least one processor to cause the computing system to classify each remaining asset in the given fleet into either the second subset of assets or the third subset of assets comprise program instructions stored on the non-transitory computer-readable medium that are executable by the at least one processor to cause the computing system to:

for each remaining asset, (a) input a second respective set of historical operating data for the asset into the respective unsupervised failure model for the asset and thereby produce a corresponding prediction of the second respective set of historical operating data for the asset, (b) evaluate the difference between the second respective set of historical operating data for the asset and the corresponding prediction as compared to the initial set of anomaly thresholds, and (c) based on the evaluation, classify the asset into (1) the second subset of assets if the difference between the second respective set of historical operating data for the asset and the corresponding prediction exceeds at least one anomaly threshold in the initial set of anomaly thresholds and (2) the third subset of assets if the difference between the second respective set of historical operating data for the asset and the corresponding prediction does not exceed any anomaly threshold in the initial set of anomaly thresholds.

7. The computing system of claim 1, wherein the program instructions that are executable by the at least one processor to cause the computing system to define the set of anomaly thresholds for the given fleet based on the respective sets of deviation bounds for the first subset of assets and the third subset of assets comprise program instructions stored on the non-transitory computer-readable medium that are executable by the at least one processor to cause the computing system to:

aggregate the respective sets of deviation bounds for the first subset of assets and the third subset of assets to produce a set of deviation bounds for the given fleet; and multiplying each deviation bound in the set of deviation bounds for the given fleet by a respective multiplication factor to produce a corresponding anomaly threshold that is included in the set of anomaly thresholds.

8. The computing system of claim 1, wherein the respective unsupervised failure model for each asset in the first subset comprises a regression model, and wherein the respective unsupervised failure model for each remaining asset in the given fleet comprises a regression model.

9. The computing system of claim 1, wherein the selected group of assets in the given fleet comprise the first subset of assets.

10. The computing system of claim 1, further comprising program instructions stored on the non-transitory computer-readable medium that are executable by the at least one processor to cause the computing system to:
after applying the set of anomaly thresholds to the historical operating data for each of the selected group of assets in the given fleet, evaluate an extent of false positives and false negatives detected by the set of anomaly thresholds; and
tune the set of anomaly thresholds to reduce the extent of false positives and false negatives.

11. The computing system of claim 10, further comprising program instructions stored on the non-transitory computer-readable medium that are executable by the at least one processor to cause the computing system to:
while evaluating the extent of false positives and false negatives detected by the set of anomaly thresholds, identify at least one asset in the third subset appearing to have at least one suspected prior failure occurrence; and
re-classify the identified at least one asset from the third subset of assets to the second subset of assets.

12. The computing system of claim 10, further comprising program instructions stored on the non-transitory computer-readable medium that are executable by the at least one processor to cause the computing system to:
apply the supervised failure model to operating data received from a given asset of the given fleet and thereby output a prediction as to the occurrence of the given failure type at the given asset.

13. The computing system of claim 1, wherein the failure data comprises:
(1) indications of occurrences of the given failure type, and (2) a respective functional failure time for each of the identified prior failure occurrences.

14. A computer-implemented method comprising:
creating a supervised failure model for assets in a given fleet of assets that is configured to receive operating data as inputs and output a prediction as to an occurrence of a given failure type at an asset of the given fleet, wherein creating the supervised failure model comprises:
identifying a first subset of assets in the given fleet that have known prior failure occurrences;
for each asset in the first subset, obtaining a respective set of cleaned historical operating data for the asset and then use the respective set of cleaned historical operating data for the asset to create a respective unsupervised failure model for the asset;
using the respective unsupervised failure model for each asset in the first subset to determine a set of deviation bounds for the first subset of assets;
for each remaining asset in the given fleet, obtaining a respective set of historical operating data for the asset and then use the respective set of historical operating data for the asset to create a respective unsupervised failure model for the asset;
based on the respective unsupervised failure model for each remaining asset in the given fleet and the set of deviation bounds for the first subset of assets, classifying each remaining asset in the given fleet into either a second subset of assets that have suspected prior failure occurrences or a third subset of assets that do not have known or suspected prior failure occurrences;
using the respective unsupervised failure model for each asset in the third subset to determine a set of deviation bounds for the third subset of assets;
based on the respective sets of deviation bounds for the first subset of assets and the third subset of assets, defining a set of anomaly thresholds for the given fleet;
applying the set of anomaly thresholds to historical operating data for each of a selected group of assets in the given fleet and thereby detect a set of anomalies that are each suggestive of a prior failure occurrence;
from the set of anomalies, identifying a subset of anomalies that are each suggestive of a prior occurrence of the given failure type; and
creating the supervised failure model using failure data for the identified subset of anomalies.

15. The computer-implemented method of claim 14, wherein using the respective unsupervised failure model for each asset in the first subset to determine a set of deviation bounds for the first subset of assets comprises:
for each asset in the first subset, (1) inputting the respective set of cleaned historical operating data for the asset into the unsupervised failure model for the asset and thereby producing a corresponding prediction of the respective set of cleaned historical operating data for the asset, (2) evaluating the difference between the respective set of cleaned historical operating data for the asset and the corresponding prediction, and (3) based on the difference, determining a respective set of asset-specific deviation bounds for the asset; and
aggregating the respective set of asset-specific deviation bounds for each asset in the first subset to produce the set of deviation bounds for the first subset of assets.

16. The computer-implemented method of claim 14, wherein the set of anomaly thresholds defined based on the respective sets of deviation bounds for the first subset of assets and the third subset of assets comprises a final set of anomaly thresholds, the method further comprising:
based on the set of deviation bounds for the first subset of assets, defining an initial set of anomaly thresholds.

17. The computer-implemented method of claim 14, wherein defining the set of anomaly thresholds for the given fleet based on the respective sets of deviation bounds for the first subset of assets and the third subset of assets comprises:
aggregating the respective sets of deviation bounds for the first subset of assets and the third subset of assets to produce a set of deviation bounds for the given fleet; and
multiplying each deviation bound in the set of deviation bounds for the given fleet by a respective multiplication factor to produce a corresponding anomaly threshold that is included in the set of anomaly thresholds.

18. A non-transitory computer-readable medium comprising programs instructions stored thereon that are executable to cause a computing system to:
  create a supervised failure model for assets in a given fleet that is configured to receive operating data as inputs and output a prediction as to an occurrence of a given failure type at an asset of the given fleet, wherein program instructions that are executable to cause the computing system to create the supervised failure model comprise program instructions stored on the non-transitory computer-readable medium that are executable by the at least one processor to cause the computing system to:
    identify a first subset of assets in the given fleet that have known prior failure occurrences;
    for each asset in the first subset, obtain a respective set of cleaned historical operating data for the asset and then use the respective set of cleaned historical operating data for the asset to create a respective unsupervised failure model for the asset;
    use the respective unsupervised failure model for each asset in the first subset to determine a set of deviation bounds for the first subset of assets;
    for each remaining asset in the given fleet, obtain a respective set of historical operating data for the asset and then use the respective set of historical operating data for the asset to create a respective unsupervised failure model for the asset;
    based on the respective unsupervised failure model for each remaining asset in the given fleet and the set of deviation bounds for the first subset of assets, classify each remaining asset in the given fleet into either a second subset of assets that have suspected prior failure occurrences or a third subset of assets that do not have known or suspected prior failure occurrences;
    use the respective unsupervised failure model for each asset in the third subset to determine a set of deviation bounds for the third subset of assets;
    based on the respective sets of deviation bounds for the first subset of assets and the third subset of assets, define a set of anomaly thresholds for the given fleet;
    apply the set of anomaly thresholds to historical operating data for each of a selected group of assets in the given fleet and thereby detect a set of anomalies that are each suggestive of a prior failure occurrence;
    from the set of anomalies, identify a subset of anomalies that are each suggestive of a prior occurrence of the given failure type; and
    create the supervised failure model using failure data for the identified subset of anomalies.

19. The non-transitory computer-readable medium of claim 18, wherein the set of anomaly thresholds defined based on the respective sets of deviation bounds for the first subset of assets and the third subset of assets comprises a final set of anomaly thresholds, the computing system further comprising program instructions stored on the non-transitory computer-readable medium that are executable to cause the computing system to:
  based on the set of deviation bounds for the first subset of assets, define an initial set of anomaly thresholds.

20. The non-transitory computer-readable medium of claim 18, wherein the program instructions that are executable to cause the computing system to define the set of anomaly thresholds for the given fleet based on the respective sets of deviation bounds for the first subset of assets and the third subset of assets comprise program instructions stored on the non-transitory computer-readable medium that are executable to cause the computing system to:
  aggregate the respective sets of deviation bounds for the first subset of assets and the third subset of assets to produce a set of deviation bounds for the given fleet; and
  multiply each deviation bound in the set of deviation bounds for the given fleet by a respective multiplication factor to produce a corresponding anomaly threshold that is included in the set of anomaly thresholds.

* * * * *